(12) United States Patent
Udale et al.

(10) Patent No.: US 12,544,184 B2
(45) Date of Patent: Feb. 10, 2026

(54) IMPLANTABLE FERROMAGNETIC MARKERS

(71) Applicant: ENDOMAGNETICS LTD., Cambridge (GB)

(72) Inventors: Robinson Udale, Cambridgeshire (GB); Gabriel Villar, Cambridgeshire (GB)

(73) Assignee: ENDOMAGNETICS LTD (GB)

( * ) Notice: Subject to any disclaimer, the term of this patent is extended or adjusted under 35 U.S.C. 154(b) by 0 days.

(21) Appl. No.: 18/575,610

(22) PCT Filed: Nov. 3, 2022

(86) PCT No.: PCT/GB2022/052780
§ 371 (c)(1),
(2) Date: Dec. 29, 2023

(87) PCT Pub. No.: WO2023/079293
PCT Pub. Date: May 11, 2023

(65) Prior Publication Data
US 2024/0310462 A1    Sep. 19, 2024

(30) Foreign Application Priority Data

Nov. 3, 2021 (GB) ...................................... 2115826

(51) Int. Cl.
*A61B 90/00* (2016.01)
*A61B 5/06* (2006.01)
(Continued)

(52) U.S. Cl.
CPC .............. *A61B 90/39* (2016.02); *A61B 5/062* (2013.01); *G01R 33/16* (2013.01); *G01R 33/286* (2013.01); *A61B 2090/3954* (2016.02)

(58) Field of Classification Search
CPC ......... A61B 90/39; A61B 5/062; A61B 5/055; A61B 2090/3954; A61B 2090/3995;
(Continued)

(56) References Cited

U.S. PATENT DOCUMENTS

| 6,173,715 B1 | 1/2001 | Sinanan et al. |
| 2003/0085703 A1 | 5/2003 | Gleich |

(Continued)

FOREIGN PATENT DOCUMENTS

| CN | 111885978 A | 11/2020 | |
| EP | 2305114 A1 * | 4/2011 | ............. A61B 34/20 |

(Continued)

OTHER PUBLICATIONS

Colombo et al., "Imaging Magnetic Nanoparticle Distributions by Atomic Magnetometry-Based Susceptometry", IEEE Transactions on Medical Imaging, vol. 39, No. 4, Apr. 2020, 12 pages.
(Continued)

*Primary Examiner* — Sean D Mattson
(74) *Attorney, Agent, or Firm* — K&L GATES LLP

(57) ABSTRACT

An implantable susceptometry marker (1001) for use in surgical guidance comprising one or more ferromagnetic elements (1004a, 1004b, 1004c); and at least one diamagnetic element (1003); wherein the one or more ferromagnetic elements are formed of at least one ferromagnetic material having an initial relative permeability of at least about 10,000 and a saturation induction Bs of less than about 1.5 T, and the at least one diamagnetic element is formed of at least one diamagnetic material having a bulk susceptibility of at least about $-0.16 \times 10^{-4}$; and wherein the total volume of diamagnetic material in the marker is about 100-10,000 times greater than the total volume of ferromagnetic material.

20 Claims, 13 Drawing Sheets

(51) Int. Cl.
*G01R 33/16* (2006.01)
*G01R 33/28* (2006.01)

(58) Field of Classification Search
CPC ........ A61B 2090/3908; A61B 2505/05; A61B 2017/00876; A61B 2017/0088; A61B 2017/00911; A61B 2562/0223; A61B 2034/2051; G01R 33/16; G01R 33/286; C01B 32/20; H01F 1/0018; H01F 1/143; H01F 1/15391; H01F 1/344
See application file for complete search history.

(56) References Cited

U.S. PATENT DOCUMENTS

| | | | |
|---|---|---|---|
| 2004/0127787 | A1 | 7/2004 | Dimmer et al. |
| 2005/0033157 | A1* | 2/2005 | Klein ............... A61B 90/39 600/411 |
| 2006/0293581 | A1 | 12/2006 | Plewes et al. |
| 2015/0011861 | A1 | 1/2015 | Rahmer et al. |
| 2015/0264891 | A1 | 9/2015 | Brander et al. |
| 2017/0252124 | A1 | 9/2017 | Greene et al. |
| 2017/0368209 | A1 | 12/2017 | Alqathami |
| 2019/0223975 | A1 | 7/2019 | Agostinelli et al. |
| 2021/0153970 | A1 | 5/2021 | Agostinelli et al. |

FOREIGN PATENT DOCUMENTS

| | | | |
|---|---|---|---|
| EP | 3517068 | | 7/2019 |
| EP | 3517068 A1 | | 7/2019 |
| JP | H6-249934 A | | 9/1994 |
| WO | 2004091408 A2 | | 10/2004 |
| WO | 2016102235 A2 | | 9/2006 |
| WO | WO-2006102235 A2 * | | 9/2006 ........... A61L 31/022 |
| WO | 2011067576 A1 | | 6/2011 |
| WO | 2013114247 A2 | | 8/2013 |
| WO | 2014013235 A1 | | 1/2014 |
| WO | 2014140566 A1 | | 9/2014 |
| WO | 2014140567 A2 | | 9/2014 |
| WO | 2016193753 A2 | | 12/2016 |
| WO | 2019180580 A1 | | 9/2019 |

OTHER PUBLICATIONS

PCT International Search Report and PCT Written Opinion for PCT International Application No. PCT/GB2022/052780; date of mailing Jan. 31, 2023; (9 pages).

Screencapture-web-archive-org-web-20210429061527; https-www-endomag-com-sentimag-2023-12-15-17_13; "Lesion localization + sentinel node biopsy in one platform."; (5 pages).

Screencapture-web-archive-org-web-20200501160132-https-www-endomag-com-magseedoverview-2023-12-15-17_24_05; "Magseed® marker for localising breast lesions" (5 pages.).

Reig, MD, MPH, Beatriu et al.; "Role of MRI to Assess Response to Neoadjuvant Therapy for Breast Cancer"; Journal of Magnetic Resonance Imaging; vol. 52; No. 6; (2020;) pp. 1587-1606.

Mathew, Chalakuzhiyl Abraham et al.; "Interactions between magnetic resonance imaging and dental material"; Journal of Pharmacy and Bioallied Sciences; vol. 15; Supplement 1; (2013); pp. S113-S116.

Sulla,Igor et al.; "Utilizing Magnetic Microwires for Sensing in Biological Applications"; Journal of Electrical Engineering vol. 66; No. 7/s; (2015); pp. 161-163.

Shahla Masood; "Neoadjuvant chemotherapy in breast cancers"; Women's Health' vol. 12(5); (2016); pp. 480-491.

Koh, MD, Jieun et al.; "Introduction of a New Staging System of Breast Cancer for Radiologists: An Emphasis on the Prognostic Stage"; Korean Journal of Radiology; (2019); pp. 69-82.

Hargreaves, Brian et al. "Metal Induced Artifacts in MRI"; AJR Am J Roentgenol; (2011); pp. 1-20.

Gao, Yanhui; "Reduction of artifact of metallic implant in magnetic resonance imaging by combining paramagnetic and diamagnetic materials"; Journal of Applied Physics; (2010); 6 pages.

"Magnetic Susceptibility of Graphite and Carbon Materials"; Modern Problems in Condensed Matter Sciences; vol. 20; Issue 1; (1988); p. 175.

"Magnetic Susceptibility of the Elements and Inorganic Compounds"; (6 pages).

Screencapture-web-archive-org-web-20211009021553-http-hyperphysics-phy-astr-gsu-edu-hbase-tables-magprop-html-2023-12-15-17_13_59; "Magnetic Susceptibilities of Paramagnetic and Diamagnetic Materials at 20"; (2 pages).

Screencapture-web-archive-org-web-20200127081810-https-mwi-inc-com-high-temperature-graphite-2023-12-15-17_20_24; "High Temperature Graphite"; MWI Carbon & Graphite Solutions; (2 pages).

Lapine, Mikhail et al.; "Broadband diamagnetism in anisotropic metamaterials"; Physical Review; (2013); pp. 024408-1-024408-7.

Magnus, F. et al.; "A DC magnetic metamaterial"; (7 pages).

Gutfeld, R. J. von et al.; "Amorphous magnetic wires for medical locator applications"; Applied Physics Letters; vol. 81; No. 10; (2002); pp. 1913-1915.

* cited by examiner

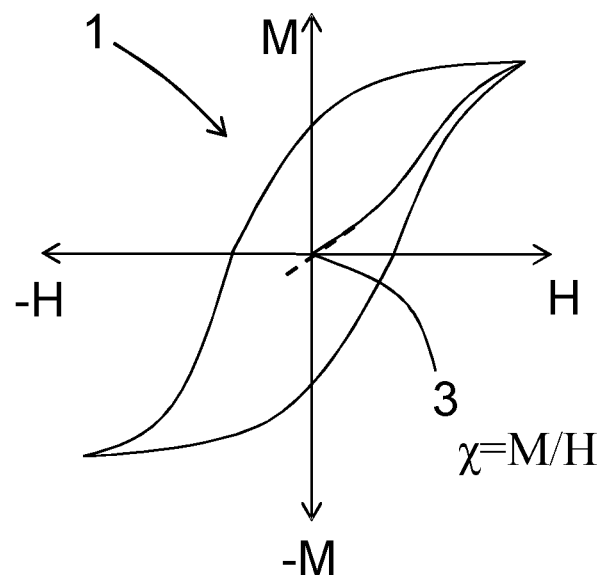
Fig. 2(a)
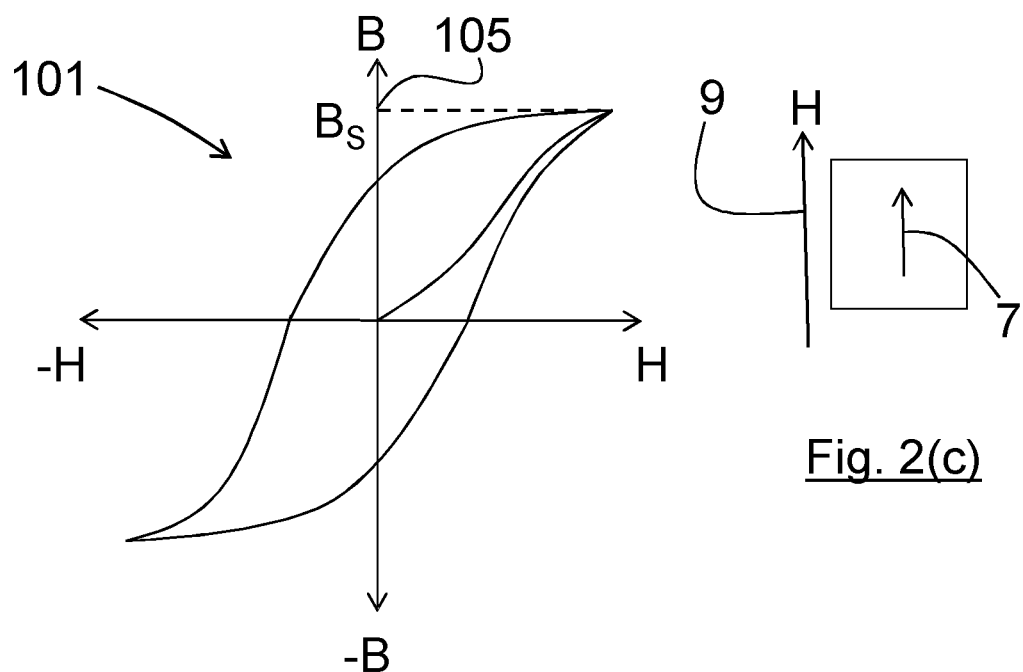
Fig. 2(b)
Fig. 2(c)

IMPLANTABLE FERROMAGNETIC MARKERS

CROSS REFERENCE TO RELATED APPLICATIONS

This is the national phase under 35 U.S.C. § 371 of International Application No. PCT/GB2022/052780 filed on Nov. 3, 2022, which claims priority to and the benefit of United Kingdom Patent Application No. 2115826.6 filed on Nov. 3, 2021, the entire disclosure of which are incorporated by reference herein.

FIELD OF THE DISCLOSURE

The present disclosure relates to an implantable marker for use in surgical guidance; in particular an implantable marker having one or more ferromagnetic elements which are detectable using a susceptometry probe which emits a magnetic field. The present disclosure also concerns a method of manufacturing such a marker and detection apparatus comprising at least one such implantable marker.

BACKGROUND

Markers are used to guide surgeons to a region of interest during a surgical procedure, where the site of interest is not physically visible or palpable; for example, a small tumour that needs to be excised. Suitably, such markers need to be deployable through a narrow gauge needle, e.g. 18G to 12G in order to reduce trauma to the patient. Typically, such markers are less than 10 mm in length, so as to be unobtrusive and to minimise trauma. The marker may be placed during a biopsy or other surgical procedure at a site of interest in the body; for example, a cancer lesion. The marker is placed under imaging guidance such as ultrasound or X-ray/mammography. During subsequent surgery, the marker is detected and localised with a handheld probe which provides audible, visual or other feedback to the surgeon to guide the surgery. Typically the marker is excised along with the surrounding tissue.

A known approach is to use a marker containing a radioisotope such as iodine-125, which can be detected using a handheld gamma detection probe. However, use of radioactive materials is closely regulated, making it challenging to set up a radioactive seed programme in all but the largest academic hospital centres.

A different approach, which is exemplified by WO 2011/067576 A1, WO 2014/013235 A1 and WO 2013/140567 A1, which are incorporated herein by reference, uses magnetic fields and a ferromagnetic marker with high magnetic susceptibility. A handheld susceptometry probe generates an alternating driving magnetic field ("sensing field"), which excites a magnetically responsive marker that produces a responding magnetic field, which is detected by the probe. Suitably, the probe is configured to produce a sensing field having a strength at source of between about 0.2 mT and about 1.2 mT, giving rise to a field strength of between about 40 µT and about 400 µT within about 5 mm of the probe. This approach has been found to be highly effective for deeper sensing to localise a tumour, typically with a diameter of less than about 20 mm, and avoids the drawbacks of RF approaches. However, in an MRI setting using a much stronger magnetic field of, for example, 1.5 T or 3 T, this approach can lead to an unwanted artefact being generated that is large compared to the marker itself and which may obfuscate the MRI image.

MRI is used to image lesions which are not visible on ultrasound or mammography for invasive breast cancer, and MRI monitoring is increasingly being used for evaluation of neoadjuvant therapy prior to surgical excision, allowing for the size for the tumours to be tracked after neoadjuvant therapy and prior to surgery. An MRI artefact of such a marker should not compromise the assessment by a healthcare professional of the size of the tumour, as a decrease in the size of the tumour would offer positive options in the management of a cancer patient. In this respect, breast cancer stages are typically evaluated using several criteria, such as the tumour size, whether the tumour has spread to the lymph nodes, and if the cancer has spread to other parts of the body (metastasis). Early stage cancers where breast conserving surgery using lumpectomy can be envisaged should preferably present a tumour size of 2 cm of less. Shashla (Neoadjuvant chemotherapy in breast cancers, September 2016, DOI: 10.1177/1745505716677139) indicates that smaller tumour size represents a good prognostic factor, and residual tumours of >2 cm are associated with higher rates of locoregional tumor recurrence after neoadjuvant chemotherapy. Koh et al. (Introduction of a New Staging System of Breast Cancer for Radiologists: An Emphasis on the Prognostic Stage, January 2019, DOI: 10.3348/kjr.2018.0231) indicate that tumours where the size is below 2 cm are classified as T1 and correspond to a cancer stage 1 or 2 which is typically when a breast conservation surgery can be envisaged. A larger tumour will more likely lead to more radical procedures, such as mastectomy. It is highly desirable therefore to be able to size the tumour under MRI when it exceeds 2 cm in diameter, enabling assessment of whether the tumour has shrunk to a size that would allow breast conservation surgery.

Ferromagnetic materials are well known for creating MRI distortions and these have been widely described in the scientific literature. For example, Hargreaves et al. (Metal Induced Artifacts in MRI, August 2017, DOI: 10.2214/AJR.11.7364) explain that some ferromagnetic materials may be safe for MRI but would still create significant artefacts. The artefact is predominantly generated by the component of the magnetic field generated by the ferromagnetic object ($B_y$) that is in the same direction as the main y-axis field produced by the MRI machine, as described in more detail below. The effect of $B_y$ is to shift the local Larmor frequency of protons near the object, and if that shift is large enough, those protons will not appear in the correct slice in an x-z plane reconstructed by the MRI machine.

Options have been studied by Gao et al. (Reduction of artefact of metallic implant in magnetic resonance imaging by combining paramagnetic and diamagnetic materials, May 2010, DOI: 10.1063/1.3352582) for decreasing the size of MRI artefacts caused by metallic implants made of paramagnetic materials, such as a cylindrical hip joint and an aneurysm clip, by coating the metallic implant with a diamagnetic material.

US 2006/0293581A1 (Plewes et al.) discloses an imaging marker comprised of glass and iron-containing aluminium microspheres in a gel matrix which shows uniformly good contrast with MR, US and X-Ray imaging. The magnetic susceptibilities of these materials are all reasonably close to that of tissue but additionally can include controlled doping with ferromagnetic or paramagnetic materials selected for particularly desirable T1 and T2 properties on MR. US 2006/0293581A1 discloses that the marker is small and can be easily introduced into tissue through a 12-gauge biopsy needle. The concentration of glass microspheres and the size dictate the contrast for US imaging. The contrast seen in MRI resulting from susceptibility losses is dictated by the number of iron-containing aluminium microspheres; while the artefact of the marker also depends on its shape, orientation and echo time. US 2006/0293581A1 also discloses that by optimizing the size, iron concentration and gel binding, an implantable tissue marker is created which is clearly visible with all three imaging modalities.

Meanwhile, US 2015/0011861A1 (Rahmer et al.) discloses a multimodal fiducial marker for registration of multimodal data, comprising a first portion comprising magnetic material visible in MPI data obtained by a magnetic particle imaging method and a second portion comprising a second material visible in image data obtained by another imaging method, which image data shall be registered with said MPI data. The first portion and the second portion are configured, or additional means are provided, such that the first portion does not adversely affect the other imaging method and its image data and that the second portion does not adversely affect the MPI method and the MPI data. In an embodiment the multimodal fiducial marker further comprises a third portion arranged between the first portion and the second portion or within the second portion. This third portion thus separates the first and second portions to avoid mutual adverse effects. Preferably, said third portion is configured as a diamagnetic shell separating the first portion from the second portion. It is thus achieved that the outer magnetic field of the marker is zero, i.e. the paramagnetism of the magnetic material of the first portion is cancelled. Further, said third portion is preferably made from a diamagnetic material, in particular bismuth or graphite.

These options rely on the fact that paramagnetic and diamagnetic materials have magnetic susceptibilities of comparable magnitude. However, they are unpromising for use with implantable magnetic markers which comprise ferromagnetic materials having a susceptibility that is typically between 10 million and 1,000 million times greater in magnitude than that of diamagnetic materials, because they would call for the use of an unfeasibly large volume of diamagnetic material to achieve any useful reduction of the net magnetic moment, and thus MRI artefact size, of the marker.

It is also known that various shapes of magnetic materials will have an impact on the size of the MRI artefact. There is therefore a need in the art for a small ferromagnetic marker with a good isotropy of sensing response, long sense range, and showing a small MRI artefact. The present disclosure seeks to provide an improved magnetic marker, with a reduced MRI artefact that overcomes, or at least alleviates, at least some of the above-mentioned drawbacks.

SUMMARY OF DISCLOSURE

According to a first aspect of the present disclosure, therefore, there is provided an implantable marker for use in surgical guidance, particularly an implantable marker that is detectable by susceptometry. The implantable marker comprises one or more ferromagnetic elements and at least one diamagnetic element. The one or more ferromagnetic elements are formed of at least one ferromagnetic material having an initial relative permeability of at least about 10,000 and a saturation induction, $B_S$ of less than about 1.5 T. The at least one diamagnetic element is formed of at least one diamagnetic material having a bulk susceptibility in the range of at least about $-016 \times 10^{-4}$. Suitably, the diamagnetic material may have a bulk susceptibility in the range of about $-0.16 \times 10^{-4}$ to about $-3 \times 10^{-4}$. The total volume of diamagnetic material in the marker is about 100-10,000 times greater than the total volume of ferromagnetic material.

As described herein, ferromagnetic materials have a high initial relative permeability and reach saturation of induction above a threshold applied field. The one or more ferromagnetic elements of the marker of the present disclosure have an initial relative permeability of at least 10,000. In some embodiments, the one or more ferromagnetic elements may have an initial relative permeability of more than 50,000. Meanwhile, diamagnetic materials may have an initial relative permeability which is at least seven orders of magnitude lower than the initial relative permeability of a ferromagnetic material and do not saturate. A typical diamagnetic material has a (negative) bulk susceptibility of less than about $1 \times 10^{-4}$. In accordance with the present disclosure, it has been found that by using suitable relative amounts of ferromagnetic and diamagnetic materials, the above-described properties of these materials may be advantageously utilised to provide an implantable marker in which, in a sensing field, the one or more ferromagnetic elements are substantially more strongly magnetised than the at least one diamagnetic element, for generating a responding magnetic field of sufficient magnitude to allow the marker to be detected in tissue using a handheld probe; and in an MRI field, the one or more ferromagnetic elements are saturated, thereby limiting their magnetisation to their saturation induction, $B_S$, while the at least one diamagnetic element, whose magnetisation is not capped by saturation, has a degree of magnetisation which is sufficiently strong to offset at least a substantial proportion of the induced magnetisation of the one or more ferromagnetic elements, thereby minimising the size of the artefact produced by the marker; especially an MRI artefact produced in an MRI image on an x-z plane of an MRI scanner.

In a sensing field, therefore, the amplitude of the magnetic moment produced by the one or more ferromagnetic elements may be 1,000 to 1 million times greater than the magnetic moment produced by the at least one diamagnetic element.

It will be understood in accordance with the present disclosure that the amount of diamagnetic material should be selected to minimise the net magnetisation of the marker in an MRI field, without "over-compensating" for the ferromagnetic material and thereby creating an unacceptably large artefact resulting from the diamagnetic material. At the time of writing, MRI machines are available with different field strengths; typically in the range of about 0.5 T to about 3 T (although fields of up to about 7 T are known for clinical application). In some embodiments of the present disclosure, therefore, the marker may comprise relative amounts of ferromagnetic and diamagnetic materials which together produce an acceptably small artefact at two or more different MRI field strengths; particularly within the range of about 0.5-10 T, preferably about 1-5 T; for example at about 1.5 T and about 3 T. For example, the marker may comprise amounts of ferromagnetic and diamagnetic materials which together have approximately no net magnetisation at one MRI field strength, while having a net magnetisation at another MRI field strength which still gives rise to an acceptably small artefact. Alternatively, the marker may comprise relative amounts of ferromagnetic and diamagnetic materials which are optimised to give rise to acceptably small artefacts at two or more different MRI field strengths. By "acceptably small" herein is meant less than about 30 mm, preferably less than about 20 mm; particularly in an MRI image on an x-z plane of an MRI machine.

Suitably, in an MRI field, a smaller one of the opposing magnetic moments generated by the one or more ferromagnetic elements or, respectively, the at least one diamagnetic element may have an amplitude of at least 25%, preferably at least 50%, of the amplitude of a greater one of the magnetic moments produced by the at least one diamagnetic element or, respectively, the one or more ferromagnetic elements; whereby the artefact produced by the marker in the MRI field may be less than about 30 mm in its longest dimension; preferably less than about 20 mm.

In accordance with a second aspect of the present disclosure, therefore, an implantable marker may comprise one or more ferromagnetic elements which are formed of at least one ferromagnetic material having an initial relative permeability of at least about 10,000 and at least one diamagnetic element formed of at least one diamagnetic material; wherein the one or more ferromagnetic elements and at least one diamagnetic element are co-located, and the at least one diamagnetic material has an apparent susceptibility such that in an MRI field the one or more ferromagnetic elements and at least one diamagnetic element generate opposing magnetic moments, the amplitude of a smaller one of which is at least about 25% of the amplitude of the other greater one.

By "co-located" herein is meant, for example, that the one or more ferromagnetic elements and the at least one diamagnetic element may be configured and arranged to occupy and extend across substantially the same space (or volume) in the marker.

As disclosed herein, a sufficient volume of diamagnetic material may be used to produce a magnetic moment which has an amplitude that is within at least 75% of the amplitude of the opposing magnetic moment generated by the one or more ferromagnetic elements, i.e. the magnetic moment generated by the diamagnetic material has an amplitude that is within a range of about 25% to about 175% of the amplitude of the opposing magnetic moment generated by the one or more ferromagnetic elements.

In some embodiments, the marker may comprise relative amounts of ferromagnetic and diamagnetic materials such that the magnetic moments generated by at least one of them under at least two different MRI fields are each separately within about 75% of corresponding magnetic moments generated by other; preferably within about 50%. Thus, in some embodiments, the magnetic moments generated by the diamagnetic material may have amplitudes under at least two different MRI fields that are each separately within a range of about 25% to about 175% of corresponding amplitudes of the opposing magnetic moments generated by the one or more ferromagnetic elements; preferably within the range of about 50% to about 150%. Suitably, therefore, the magnetic moments produced by the at least one diamagnetic element under at least two different MRI fields may each separately be at least 25% or more of the corresponding magnetic moments produced by the one or more ferromagnetic elements. In this manner, the amounts of ferromagnetic and diamagnetic material in the marker may be optimised to target an acceptably small artefact under two or more different MRI fields; particularly in the range about 0.5-10 T, preferably 1-5 T, e.g. at 1.5 T and 3 T.

As described above, the sensing field may suitably have a strength of between about 0.1 mT and about 2.0 mT at source; preferably about 0.2 mT and about 1.2 mT, giving rise to a field strength of between about 40 $\mu$T and about 400 $\mu$T within about 5 mm of the probe. Conveniently, this may allow the marker to be detected at a range of up to about 50 mm, about 60 mm, about 70 mm or even up to about 80 mm from the probe.

According to a third aspect of the present disclosure, therefore, there is provided a detection system for locating an implantable marker, the system comprising at least one implantable marker according to the present disclosure, at least one drive coil arranged to excite the marker with an alternating magnetic field and at least one sense coil arranged to detect a signal received from the excited marker; a magnetic field generator arranged to drive an alternating magnetic field through the at least one drive coil; and at least one detector arranged to receive the signal from the sense coil and detect one or more harmonics of the drive frequency in the received signal. In particular, the detection system may be a susceptometry detection system.

Meanwhile, the MRI field may typically have a strength of at least 1.5 T. Suitably, the one or more ferromagnetic elements may be configured and arranged, as disclosed herein, to generate a responding magnetic field of sufficient magnitude to allow the marker to be detected in tissue with a handheld susceptometry probe in a sensing field at least 200,000 times weaker than an MRI field; preferably at least 400,000 times weaker and, in some embodiments, up to 800,000 or more times weaker.

Suitably, the one or more ferromagnetic elements may have a saturation induction $B_S$ of less than about 1.5 T; preferably less than about 1 T. Thus, in some embodiments, the one or more ferromagnetic elements may be configured and arranged, as disclosed herein, to generate a responding magnetic field of sufficient magnitude to allow the marker to be detected in tissue with a handheld susceptometry probe in a sensing field at least 1,000 times weaker than $B_S$ of the one or more ferromagnetic elements.

Suitably, the at least one diamagnetic element may have a total volume that is about 100-10,000 times greater than the volume of the one or more ferromagnetic elements; preferably about 500-3,000 times.

In some embodiments, the one or more ferromagnetic elements may have a total volume of less than about $1\times10^{-10}$ m$^3$; preferably less than about $5\times10^{-11}$ m$^3$, $3\times10^{-11}$ m$^3$, or $1\times10^{-11}$ m$^3$. In some embodiments, the one or more ferromagnetic elements may have a total volume which is as low as about $1\times10^{-12}$ m$^3$.

Typically, the total volume of the at least one diamagnetic element may be between about $1\times10^{-9}$ m$^3$ and $1.5\times10^{-7}$ m$^3$; typically up to about $1\times10^{-8}$ m$^3$.

Advantageously, it has been found that a marker comprising volumes of ferromagnetic and diamagnetic materials within these ranges may be presented in a form having dimensions which are suitable for implantation, typically by injection. For example, the marker may have a width in the range of about 0.8 mm to about 3 mm; preferably about 1-1.5 mm. The marker may have a length of about 2-10 mm.

United Kingdom patent application no. 2115827.4, the contents of which are incorporated herein by reference, discloses an implantable marker comprising one or more pieces of a ferromagnetic material having a total length to diameter ratio of at least about 50, preferably at least about 650, and a total volume of less than about $1\times10^{-10}$ m$^3$, preferably less than about $5\times10^{-11}$ m$^3$. As disclosed therein, it has been found that by increasing the length-to-diameter ratio of the at least one piece of ferromagnetic material, the sensing response of the marker may be improved, thereby allowing a smaller volume of ferromagnetic material to be used for a given responding field, which gives rise to a smaller MRI artefact. Suitably, in accordance with the present disclosure, therefore the one or more ferromagnetic elements may have a total length to diameter ratio of at least about 50.

United Kingdom patent application no. 2115827.4 also discloses how the one or more pieces of a ferromagnetic material may be configured to optimise the isotropy of the responding field generated by the marker. The one or more ferromagnetic elements of the marker of the present disclosure may be configured in accordance with the disclosure of that application to achieve a ratio of magnetic flux anisotropy of less than 7, preferably less than 5. Suitably, the one or more ferromagnetic elements of the marker of the present disclosure may be configured as disclosed herein; for example as a helix or a multiple helix.

Those skilled in the art will appreciate that to derive maximal benefit from the use of a sufficient volume of diamagnetic material that has a magnetisation in an MRI field that is comparable with the magnetisation of the one or more ferromagnetic elements, the at least one diamagnetic element may advantageously be configured and arranged to create an artefact in an MRI field that has a similar shape, but opposite polarity, to the artefact created by the one or more ferromagnetic elements. In some embodiments, the one or more ferromagnetic elements and the at least one diamagnetic element may therefore be co-located.

Suitable configurations and arrangements of the ferromagnetic and diamagnetic elements may be determined empirically by using suitable mathematical modelling or computer-aided engineering (CAE) software such, for example, as that which is available from Comsol AB (Sweden) under the trade mark COMSOL Multiphysics® or from Ansys, Inc. (Canonsburg, PA) under the trade mark ANSYS®, to produce simulated contour maps of the respective artefacts that would be produced by the one or more ferromagnetic elements and at least one diamagnetic element in an MRI field and iteratively adjusting the configuration and arrangement of the elements until the contour maps substantially match.

Suitably, the at least one diamagnetic element may be configured as disclosed herein; for example as a cylinder. The one or more ferromagnetic elements may, in some implementations of the disclosure, be wrapped around an outer surface of the cylinder as a helix or multiple helices.

According to a fourth aspect of the present disclosure therefore there is provided a method of manufacturing an implantable magnetic marker for use in surgery, which comprises forming one or more ferromagnetic elements from at least one ferromagnetic material having an initial relative permeability of at least 10,000 and a saturation induction $B_S$ of less than about 1.5 T; forming at least one diamagnetic element from at least one diamagnetic material, the at least one diamagnetic material having a bulk susceptibility of at least about $-0.16 \times 10^{-4}$, the total volume of diamagnetic material being about 100-10,000 times greater than the total volume of ferromagnetic material; and thereafter assembling the one or more ferromagnetic elements and at least one diamagnetic element, such that the at least one diamagnetic element is co-located with the one or more ferromagnetic elements and is configured such that in an MRI field it produces an artefact having a size and shape that at least partially matches the size and shape of an artefact produced by the one or more ferromagnetic elements.

Suitably, the artefact produced by the at least one diamagnetic element in the MRI field may at least partially overlap the artefact produced by the one or more ferromagnetic elements.

In some embodiments, the one or more ferromagnetic elements and at least one diamagnetic element may generate opposing magnetic moments, the amplitude of a smaller one of which is at least 25% of the amplitude of the other larger one.

The one or more ferromagnetic elements and at least one diamagnetic element may comprise respective volumes of ferromagnetic and diamagnetic materials that are selected such that in a sensing field, the one or more ferromagnetic elements are substantially more strongly magnetised than the at least one diamagnetic element, for generating a responding magnetic field of sufficient magnitude to allow the marker to be detected in tissue using a handheld susceptometry probe. In the MRI field, the at least one diamagnetic element has a degree of magnetisation which is sufficiently strong to offset at least a substantial proportion of the magnetisation of the one or more ferromagnetic elements, thereby minimising the size of the artefact produced by the marker, as disclosed herein.

Suitably, the one or more ferromagnetic elements may be configured and arranged to maximise the strength and isotropy of a responding field generated in response to the sensing field.

The at least one diamagnetic element may be configured and arranged, for example as disclosed above, to produce an artefact in the MRI field which has a size and shape that matches the artefact size and shape of an artefact produced by the one or more ferromagnetic elements to a sufficient degree, especially in an x-z plane defined by the MRI machine in which the principal magnetic field is oriented along the y-axis, to reduce the maximum dimension of the artefact created by the marker to less than about 30 mm.

As disclosed in international patent application PCT/GB2022/052775, the contents of which are incorporated herein by reference, it has been found that the manufacture of a marker having the above-mentioned properties may be facilitated by the use of a diamagnetic material having a relatively high (negative) magnetic susceptibility (for a diamagnetic material). Thus, in some embodiments of the present disclosure, the at least one diamagnetic element may advantageously be formed from a diamagnetic material having a bulk (negative) susceptibility of more than about $0.16 \times 10^{-4}$, or more than about $1 \times 10^{-4}$. In some embodiments, the diamagnetic material may have a bulk (negative) susceptibility of about $1 \times 10^{-4}$ to about $3 \times 10^{-4}$ or more. Suitable diamagnetic materials may include pyrolytic graphite, graphite and bismuth. Pyrolytic graphite may have a bulk (negative) susceptibility of about $2.7 \times 10^{-4}$, is biocompatible and can be machined or deposited directly into a rod. Bismuth may have a bulk (negative) susceptibility of about $1.6 \times 10^{-4}$, is non-toxic and can be cast or extruded into a wire.

Surprisingly, it has been found that graphite having a substantially isotropic grain structure may have an apparent bulk (negative) susceptibility of about $1.2 \times 10^{-4}$ when arranged juxtaposed one or more ferromagnetic elements. Further, graphite having a substantially isotropic grain structure offers acceptable isotropic susceptibility, whilst being inexpensive and readily machinable into shape, and having good biocompatibility characteristics. Graphite having a substantially isotropic grain structure may be formed by isostatic pressing.

Suitably, the graphite should have a high purity. Isostatically pressed graphite is conveniently produceable in suitable grades with <300 ppm. In some embodiments, the graphite may have fewer than 5 ppm of impurities.

Advantageously, the isotropic graphite may have a high density which has been found to increase its susceptibility. Thus, in some embodiments, the graphite may have a density of at least about 1.75 g·cm$^{-3}$, e.g. about 1.85 g·cm$^{-3}$. In some embodiments, the graphite may have a density of up to about 1.95 g·cm$^{-3}$. A density in this range implies a low porosity.

In some embodiments, the suitability of the graphite material may be further increased by heat treatment at a temperature in excess of about 2,200° C. Heat treatment may take place simultaneously with or subsequent to pressing. Heat treatment may advantageously reduce the number density of voids or impurities, which may include paramagnetic particles, in the graphite.

According to a fifth aspect, therefore, the present disclosure comprehends the use of graphite having a substantially isotropic grain structure in an implantable marker for detection by susceptometry comprising one or more ferromagnetic elements, for reducing the net magnetic moment of the marker in an MRI field, thereby to minimise the size of an artefact created by the marker.

Thus, according to this aspect of the present disclosure, the implantable marker may comprise one or more ferromagnetic elements and at least one diamagnetic element which is formed from graphite having a substantially isotropic grain structure; for example, isostatically pressed graphite.

In some embodiments, it is envisaged that alternative diamagnetic materials such, for example, as diamagnetic metamaterials may be used which may have advantageous magnetic susceptibilities, allowing smaller volumes of diamagnetic material to be used in the marker.

It will be appreciated that features described herein in relation to one aspect of the present disclosure may be incorporated into other aspects of the present disclosure. For example, the method of the disclosure may incorporate features described with reference to the marker of the disclosure and vice versa.

DESCRIPTION OF THE DRAWINGS

Following is a description by way of example only with reference to the accompanying drawings of embodiments of the present disclosure.

In the drawings:

FIG. 2(a) is a hysteresis curve 1 showing magnetisation as a function of magnetic field, H, for a typical ferromagnetic material;

FIG. 2(b) is a similar hysteresis curve to FIG. 2(a) showing magnetic flux, B, as a function of magnetic field, H, for a typical ferromagnetic material;

FIG. 2(c) is a schematic diagram showing direction of the magnetic moment generated in a ferromagnetic material when subject to an applied magnetic field H;

DEFINITIONS

Figure 1A:
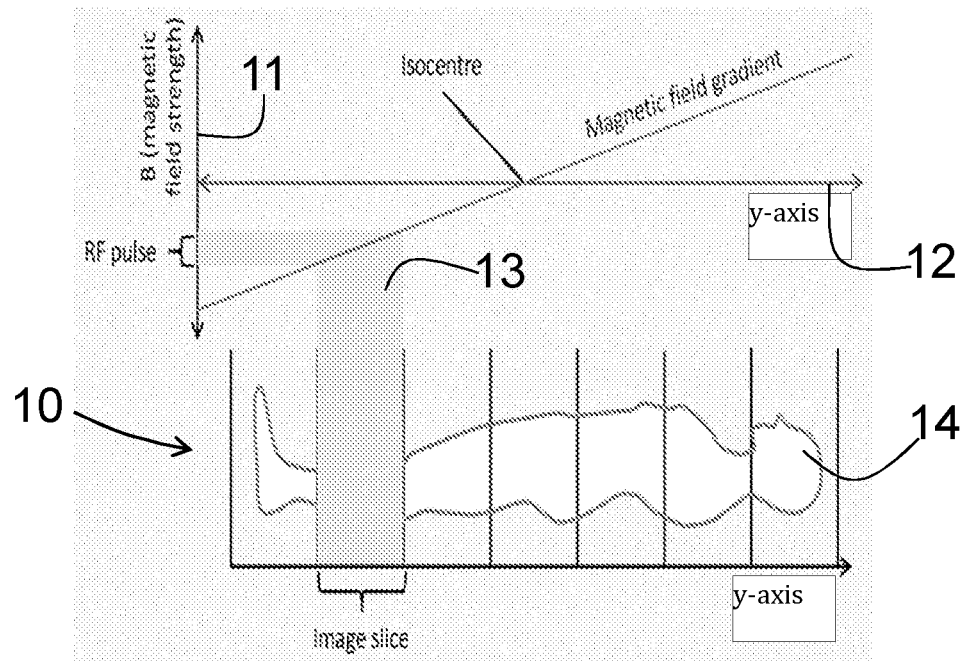
FIG. 1(a) is a schematic side view of a person lying in an MRI scanner, which indicates the field B gradient on a y-axis of a main magnetic field.

Magnetic flux density, B, is a vector field measuring the strength and direction of the magnetic field around a magnet or an electric current;

Magnetic field strength, or the magnetising field, H, is a vector field that describes the magnetic influence on moving electric charges, electric currents, and magnetic materials;

Magnetisation, or magnetic polarisation, M, is a vector field that expresses the density of permanent or induced magnetic dipole moments in a magnetic material;

Saturation of induction is the state reached when an increase in applied external magnetic field, H, cannot increase the magnetisation, M, of the material further. In this state, the total magnetic flux density that results is called the saturation induction, $B_S$, and the magnetisation is the saturation magnetisation, $M_S$;

Magnetic susceptibility, $\chi$, is a measure of how much a material will become magnetised in an applied magnetic field, defined as $\chi=M/H$;

Bulk susceptibility, is a measure of the magnetic susceptibility of a material in its bulk shape when placed in a magnetic field;

Apparent bulk (diamagnetic) susceptibility, is a measure of the magnetic susceptibility of a diamagnetic material in its bulk shape when placed in a magnetic field in the presence of one or more shaped ferromagnetic materials;

Magnetic permeability, $\mu$, is the measure of a material's resistance against the formation of a magnetic field, defined as $\mu=B/H$;

Relative magnetic permeability ($\mu_r$) is the ratio of magnetic permeability to the permeability of free space ($\mu_0$); that is $\mu_r=\mu/\mu_0$. It is related to $\chi$ by the equation $\mu_r=1+\chi$;

Initial susceptibility ($\mu_i$) is a measure of how much a material of infinite extent will become magnetised in a small applied magnetic field. It is defined as $\mu_i=M/H$ for small H (e.g. less than 0.01 mT), or equivalently $$\chi_i = \frac{\partial M}{\partial H}\bigg|_{H=0};$$

Apparent susceptibility, is a measure of the magnetic susceptibility of a material having a specific geometry when placed in a magnetic field;

Apparent initial susceptibility ($\chi_{app}$), also known as effective susceptibility, is the initial susceptibility for a material of specific geometry in a small applied magnetic field. That is, it is $\chi_i$ after taking into account the demagnetisation factor;

Initial relative magnetic permeability ($\mu_{r,i}$) is the value of $\mu_r$ for small H, and is related to the initial susceptibility by $\mu_{r,i}=1+\chi_i$;

Apparent relative magnetic permeability ($\mu_{app}$) is the relative magnetic permeability of a material of specific geometry. That is, it is $\mu_r$ after taking into account the demagnetisation factor.

A ferromagnetic material has a variable permeability, $\mu$, that increases relative to the magnetic field and up to a maximum. Many ferromagnetic materials have a maximum permeability that can exceed 100,000;

A paramagnetic material has a constant magnetic permeability, $\mu$, slightly greater than 1;

A diamagnetic material has a constant magnetic permeability, $\mu$, slightly less than 1. Diamagnetism causes a repulsive effect by creating a small magnetic field in opposition to an externally applied field.

Figure 1B:
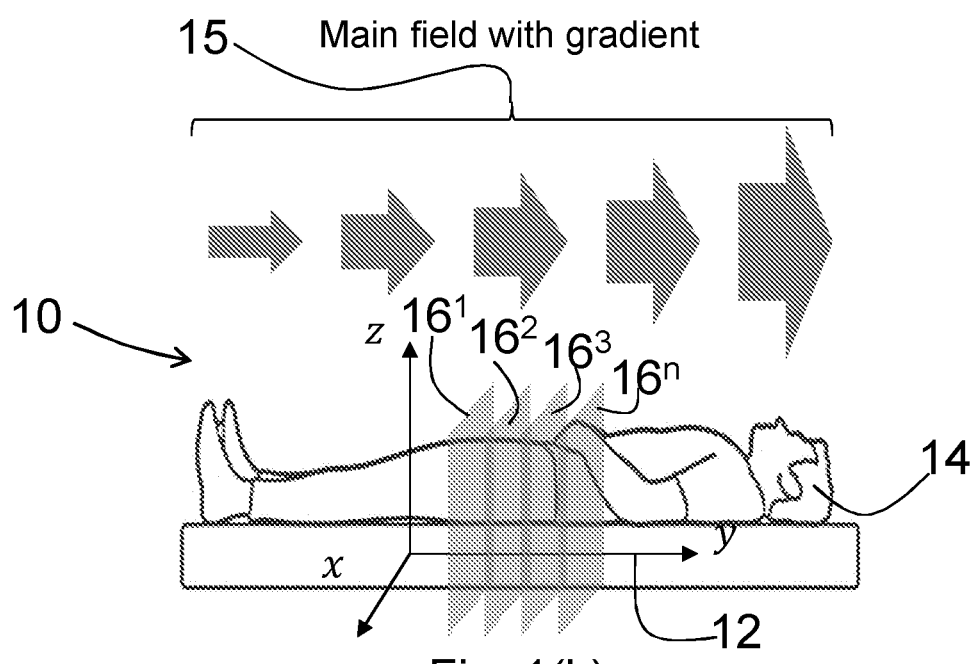
FIG. 1(b) is another schematic side view of an MRI scanner which shows how image slices are cut up along the y-axis and indicates the orientation of the x, y and z axes.

Coercivity is the magnetising field, H, needed to demagnetise a magnetic material completely;

Hard magnetic materials, or permanent magnets, have a high coercivity;

Soft magnetic materials have a low magnetic coercivity, and therefore are easily magnetised and demagnetised;

Demagnetising field, or stray field, is the magnetic field, H, inside the magnet generated by the magnetisation, M, of a magnetic material. It gives rise to shape anisotropy in ferromagnets with a single magnetic domain and to magnetic domains in larger ferromagnets;

Demagnetisation factor is a quantity that must be used in order to determine the demagnetising field. An arbitrarily shaped magnetic object has a total magnetic field that varies with location inside the object and can be complicated to calculate. This makes it difficult to determine the magnetic properties of a material, such as, for instance, how the magnetisation of a material varies with the magnetic field;

Magnetic anisotropy describes the variation of magnetic properties depending on the material orientation;

Magnetic anisotropy ratio is the ratio of the strongest to weakest magnetic signals produced by a marker at a constant distance at different orientations of the marker relative to a probe;

The magnetic moment is the magnetic strength and orientation of a magnet or other object that produces a magnetic field;

The magnetic dipole moment is a vector quantity associated with the magnetic properties of electric current loops;

Magnetic Resonance Imaging (MRI) is a non-invasive imaging technology that produces three dimensional detailed anatomical images. A typical MRI scanner 10 is illustrated schematically in FIGS. 1(*a*) and 1(*b*). A uniform main magnetic field 11, $B_0$, is aligned with a longitudinal y-axis 12 of the scanner. An RF pulse 13 $B_1$ is applied to perturb momentarily the net magnetisation M of atomic nuclei within the tissue of a patient 14 who lies within the scanner, as shown in FIG. 1(*a*). This RF excitation tips the magnetisation transiently away from the y-axis (i.e. parallel to $B_0$, where signal cannot be detected) to a transverse x-z plane (i.e. orthogonal to the y-axis), where it can be detected by suitable receiver coils. After the RF pulse is turned off, the magnetisation of the atoms relaxes and exhibits precession as it returns to its thermal equilibrium configuration. It is possible to detect the magnetisation because the transverse component of processing magnetisation induces an electromotive force in the receiver coils. This is detected as an NMR signal. The received signal is spatially encoded by the application of magnetic field gradients 15 which are superimposed on the main magnetic field as shown in FIG. 1(*b*).

MRI metal artefacts occur at interfaces of tissues and metal with different magnetic susceptibilities which cause local magnetic fields to distort the external magnetic field. This distortion changes the precession frequency in the tissue leading to spatial mismapping of information. $B_{crit}$ is defined as a critical change in magnetic flux B in the direction of the main field produced by an MRI machine at which an artefact is produced, which is caused by the metal, such that a voxel is mapped to an incorrect slice imaged by the MRI machine. In a typical MRI machine of the kind illustrated in FIGS. 1(*a*) and 1(*b*), the main field is aligned with a y-axis 12 and the slices $16^1$, $16^2$, $16^3$, ... $16^n$ are respective x-z planes, orthogonal to the main y-axis 12. Accordingly, artefacts in an MRI image are generally artefacts in an x-z plane.

DETAILED DESCRIPTION

It is an object of the present disclosure to provide an implantable marker, particularly a marker that is adapted for detection by susceptometry, comprising one or more ferromagnetic elements, which generates a detectable response magnetic field at a probe when subjected to a driving magnetic field emitted by a handheld susceptometry probe, and which produces a minimally sized artefact when subjected to a much stronger magnetic field in an MRI scanner; particularly in an x-z plane of the scanner.

In one aspect, therefore, the present disclosure provides an implantable marker for use in surgical guidance. The implantable marker comprises one or more ferromagnetic elements and at least one diamagnetic element. The one or more ferromagnetic elements and at least one diamagnetic element comprise respective amounts of ferromagnetic and diamagnetic materials such that, in a sensing field of less than about 0.5 mT (at source), the one or more ferromagnetic elements are substantially more strongly magnetised than the at least one diamagnetic element, for generating a responding magnetic field of sufficient magnitude to allow the marker to be detected in tissue using a handheld probe; and in an MRI field of 0.5 T or more, typically 1.5 T or more, the at least one diamagnetic element has a degree of magnetisation which is sufficiently strong to counteract at least a substantial proportion of the induced magnetisation of the one or more ferromagnetic elements. In this way, the marker of the present invention may produce a smaller MRI artefact than would a marker comprising the identical amount of ferromagnetic material without any diamagnetic material. Thus, for a given volume of ferromagnetic material, the size of the MRI artefact may be reduced to an acceptable size.

As described in more detail below, the one or more ferromagnetic elements may advantageously comprise a total volume of ferromagnetic material of less than about $1\times10^{-10}$ m$^3$. In some embodiments, the total volume of the one or more pieces of ferromagnetic material may be less than about $5.3\times10^{-11}$ m$^3$. In some embodiments, the total volume of the one or more pieces of ferromagnetic material may be less than about $5\times10^{-11}$ m$^3$, less than about $3\times10^{-11}$ m$^3$, or less than about $1\times10^{-11}$ m$^3$. In some embodiments, the one or more ferromagnetic elements may have a total volume as low as about $1\times10^{-12}$ m$^3$.

In order to maximise its or their magnetisation in a sensing field, the one or more ferromagnetic elements may have a total length (i.e. the sum of the lengths of all ferromagnetic elements where there are more than one) to diameter (or square root of cross-sectional area) ratio of at least about 50, as disclosed in the United Kingdom patent application no. 2115827.4. Thus, in some embodiments, the total length to diameter (or square root of cross-sectional area) ratio of the one or more pieces of ferromagnetic material may be at least about 100, at least about 200, at least about 300, at least about 400, at least about 500, at least about 650, or at least about 750. In some embodiments, the total length to diameter (or square root of cross-sectional area) ratio of the one or more pieces of ferromagnetic material may be at least 1000, at least 2000 or at least 3000.

By way of example, the one or more pieces of ferromagnetic material may have a total length of about 50 mm and a diameter of about 15 μm. In such an example, the total length to diameter ratio of the one or more pieces of ferromagnetic material may be approximately 3,300, and the volume may be approximately $9\times10^{-12}$ m$^3$. In another embodiment, the one or more pieces of ferromagnetic material may have a total length of about 36 mm and a diameter of about 15 μm. In such an example, the total length to diameter ratio of the one or more pieces of ferromagnetic material may be approximately 2,400, and the volume may be approximately $6.4\times10^{-12}$ m$^3$ In some embodiments, the marker may comprise a wire or strip of ferromagnetic material having a length of at least about 3 mm, about 6 mm, about 10 mm, about 30 mm, 50 mm or about 100 mm long. A wire may have a diameter less than about 100 μm; or less than or equal to about 50 μm, about 30 μm, about 15 μm or about 10 μm. The marker may comprise a wire or strip of ferromagnetic material having a total length of no more than about 3 mm, about 6 mm, about 10 mm, about 30 mm, about 50 mm or about 100 mm long. Suitably, the wire or strip may be formed into one or more pieces, as described herein.

Suitably, the ferromagnetic material may have an initial relative permeability of at least about 10,000. In some embodiments, the ferromagnetic material may have an initial relative permeability of at least about 50,000 or at least about 70,000. In some embodiments, the ferromagnetic material may have an initial relative permeability of up to or even more than about 100,000.

Further, as described below, the ferromagnetic material may have a saturation induction that is weaker than a typical MRI field. Suitably, therefore, the ferromagnetic material may have a saturation induction $B_S$ of less than about 1.5 T; preferably less than about 1.0 T; more preferably less than about 0.7 T.

The at least one diamagnetic element may suitably comprise a total volume of diamagnetic material that is between about 100-10,000 times greater than the total volume of the ferromagnetic material of the one or more ferromagnetic elements; preferably about 500-3,000 times greater; e.g. about 950-1,050 times greater, or about 500-950 times greater, or about 500-1,050 times greater. Thus, the at least one diamagnetic element may have a total volume of between about $1\times10^{-9}$ m$^3$ and $1.5\times10^{-7}$ m$^3$. By selecting respective amounts of ferromagnetic and diamagnetic material within these ratios and/or volumes, and by virtue of saturation of induction of the ferromagnetic material in an MRI field, the amplitudes of the opposing magnetic moments generated by the one or more ferromagnetic elements and at least one diamagnetic element in an MRI field may be of the same order of magnitude. Preferably, the amplitude of a smaller one of the magnetic moments generated in an MRI field by the one or more ferromagnetic elements, or at least one diamagnetic element, may be at least 25%, preferably at least 50%, of the amplitude of a larger magnetic moment produced by the at least one diamagnetic element, or respectively one or more ferromagnetic elements. In this way, the artefact size of the marker in an MRI field may be acceptable, i.e. less than about 30 mm in its longest dimension; preferably less than about 20 mm; particularly in an x-z plane of an MRI scanner as defined herein. Further, the total volume of ferromagnetic and diamagnetic material allows a marker to be manufactured which is sufficiently small as to be deployable through a narrow gauge needle, e.g. 18G to 12G.

The one or more ferromagnetic elements and at least one diamagnetic element may suitably be configured and arranged to produce mutually opposing magnetic moments in the presence of an applied magnetic field. In particular, when the marker is placed in an applied magnetic field, H, the one or more ferromagnetic elements produce a magnetic moment, $m_{ferromagnet}$, and the at least one diamagnetic element produces an opposing magnetic moment, $m_{diamagnet}$. The net magnetic moment of the marker, $m_{total}$, is thus given by $m_{total}=m_{ferromagnet}-m_{diamagnet}$. In a sensing field of less than about 0.5 mT (at source), the net magnetic flux produced by the marker determines the strength of the signal generated by the marker. In an MRI field, the magnetic flux produced by the marker impacts the size of an artefact generated in an MRI image.

As those skilled in the art will be aware, an MRI magnetic field may typically have a strength of between 0.5 T and 10 T or more; particularly between about 1.5 T and 7 T.

In the field of the present disclosure, a handheld susceptibility probe may be used by a surgeon to detect and localise the marker after implantation. Suitably, the probe may be a probe as described in WO 2014/140566 A1, the contents of which are incorporated herein by reference; for example a Sentimag™ probe, which is commercially available from Endomagnetics Ltd, UK.

The probe may produce a sensing field having a strength at source of between about 0.1 mT and about 2.0 mT, preferably between about 0.2 mT and about 1.2 mT, e.g. about 0.3 mT. This may give rise to a field strength of between about 25 µT and about 500 µT, preferably about 40 µT and about 400 µT, within about 5 mm of the probe, which may be at least 1,000 times weaker than $B_S$ of the one or more ferromagnetic elements. Typically, the sensing field may be an oscillating magnetic field. The sensing field may therefore oscillate with an amplitude at the source of between 0.1 mT and 2.0 mT; preferably between about 0.2 mT and about 1.2 mT.

In use, the sensing field generates a magnetic moment in the ferromagnetic material when the sensing probe is close to the marker, and the marker generates a detectable responding magnetic signal. Under a sensing field of the kind described, it is desirable for the marker to be readily detectable. It is desirable for the marker to have a relatively strong net magnetic moment and produce a relatively high magnetic flux density (B) within the context of the sensing field. It is desirable that the magnetic flux is suitably isotropic (in practice a magnetic anisotropy ratio of less than 7, preferably less than 5, may suffice), so that the marker can be detected from reasonably far distances, and consistently from any direction. Under sensing fields, the magnetic signal generated by a marker is dominated by the at least one ferromagnetic element, as explained in more detail below. Fields of the magnitude described in the previous paragraph may typically allow the marker of the present disclosure to be detected at a range of up to about 50 mm, about 60 mm, about 70 mm or about 80 mm from the probe.

FIG. 2(a) is a hysteresis curve 1 showing magnetisation, M, as a function of applied magnetic field, H, for a typical ferromagnetic material. Ferromagnetic materials typically have a high initial magnetic susceptibility, as indicated by the dashed line 3, developing a strong magnetisation, M, when subject to a small applied magnetic field, H. FIG. 2(b) is a similar hysteresis curve 101 showing magnetic flux density, B, as a function of magnetic field, H, for a typical ferromagnetic material. Ferromagnetic materials typically reach magnetic saturation (at saturation induction $B_S$) 105 under relatively low applied magnetic fields (H). The magnetic moment of the ferromagnetic material 7, is in the same direction as the applied magnetic field 9, as shown in FIG. 2(c).

The magnetic moment, $m_{ferromagnet}$ of the one or more ferromagnetic elements in a sensing field is defined as $m_{ferromagnet}=\chi_{app,ferromagnet}H\cdot V_{ferromagnet}$. The magnetic flux density (B) or magnetic field produced by the total ferromagnetic material in the marker is given approximately by:

$$B_{ferromagnet} = \frac{\mu_0 \chi_{app,ferromagnet} H \cdot V_{ferromagnet}}{2\pi y^3}$$

where $\chi_{app,ferromagnet}$ is apparent susceptibility of the one or more ferromagnetic elements, which is dependent upon the size and shape of the or each ferromagnetic element, in particular the aspect ratio, $V_{ferromagnet}$ is the total volume of ferromagnetic material, $\mu_0$ is the magnetic permeability in a classical vacuum, and y is the distance from the marker. The magnetic signal produced by the one or more ferromagnetic elements is proportional to the magnetic flux density produced by the one or more ferromagnetic elements and will therefore be dependent upon the total volume of magnetic material ($V_{ferromagnet}$), the strength of the applied field (H), and the apparent susceptibility of the magnetic material ($\chi_{app,ferromagnet}$). The apparent susceptibility of the magnetic material is much larger for a long, thin ferromagnetic element, and the strength of the magnetic signal produced by the at least one ferromagnetic element reduces with distance, y, away from the element (in inverse proportion to the distance cubed).

Figure 3A:
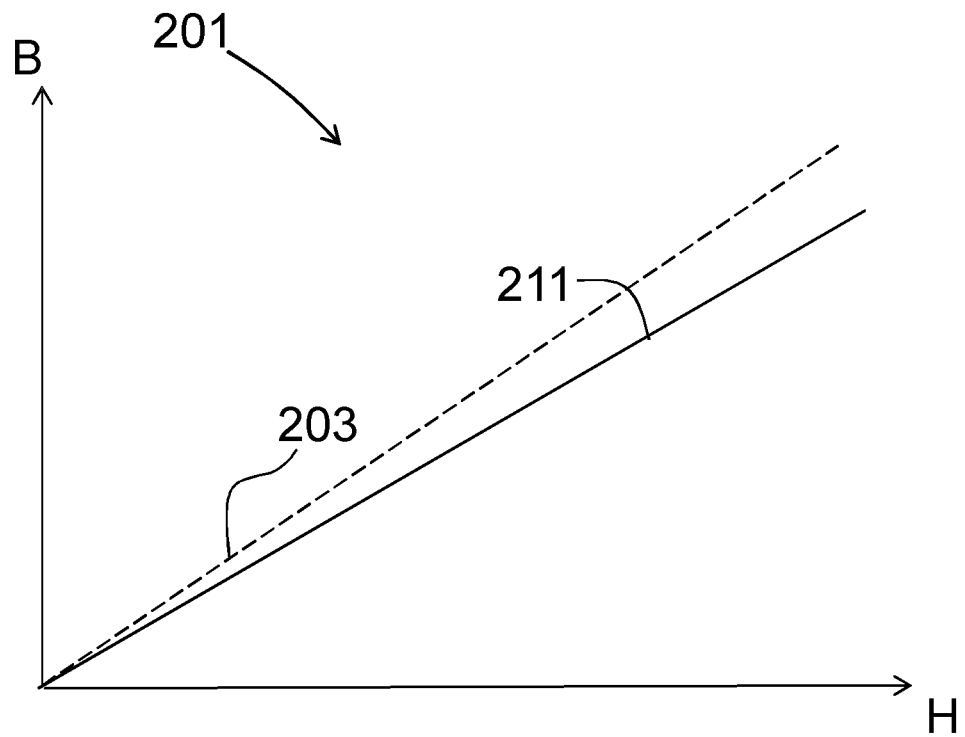
FIG. 3(a) is a graph showing magnetic flux, B, as a function of magnetic field, H, for a typical diamagnetic material.
Figure 3B:
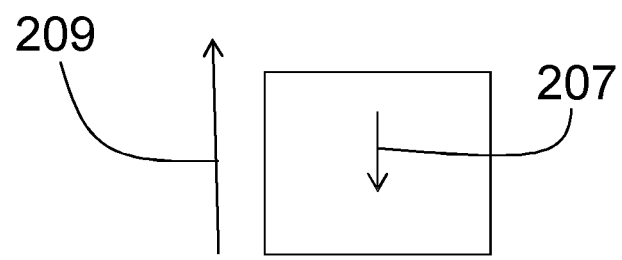
FIG. 3(b) is a schematic diagram showing direction of the magnetic moment generated in a diamagnetic material when subject to an applied magnetic field.

FIG. 3(a) is a graph 201 showing magnetic flux, B, as a function of magnetic field, H, for a typical diamagnetic material. As shown in FIG. 3(a), diamagnetic materials typically have low initial magnetic susceptibilities and show linear increases in magnetisation 211 up to relatively high magnetic fields, without reaching saturation. As a diamagnetic material, the magnetic flux B is less than that of free space, as indicated by dashed line 203 which is shown for reference, because the induced magnetisation opposes the magnetic field H. As shown in FIG. 3(b), when diamagnetic materials are subjected to an applied field, a magnetisation, or magnetic moment 207 is induced that opposes the direction of the applied field 209. As described herein, the at least one diamagnetic element of the present disclosure may have an initial (negative) susceptibility with a magnitude of less than $1\times10^{-3}$, typically less than about $3\times10^{-4}$, when subjected to a magnetic field of less than 0.01 mT. The magnetic moment, $m_{diamagnet}$, of the at least one diamagnetic element in a sensing field is defined as $m_{diamagnet}=\chi_{app,diamagnet}H\cdot V_{diamagnet}$. The magnetic flux density (B) generated by the diamagnetic element is given by:

$$B_{diamagnet} = \frac{\mu_0 \chi_{app,diamagnet} H \cdot V_{diamagnet}}{2\pi y^3}$$

wherein the $\chi_{app,diamagnet}$ is the apparent susceptibility of the at least one diamagnetic element, which is dependent upon the size and shape of the at least one diamagnetic element, in particular the aspect ratio, $V_{diamagnet}$ is the total volume of diamagnetic material and y is the distance from the element. The at least one diamagnetic element of the present disclosure has a significantly smaller apparent susceptibility than the one or more ferromagnetic elements.

In a sensing field, the magnetic moment of the one or more ferromagnetic elements is high in relation to an opposing magnetic moment of the at least one diamagnetic element. The magnetic moment of the one or more ferromagnetic elements may be at least 1,000 to 1 million times greater in magnitude than the opposing magnetic moment of the at least one diamagnetic element Magnetic fields commonly used in MRI machines are several orders of magnitude stronger than the sensing fields described above, with the most common clinical MRI machines being 1.5 T or 3 T at the time of writing. In some embodiments of the present disclosure, therefore, the MRI magnetic field may typically be between 1 and 5 T, although in some embodiments it may be as high as 7 T or more.

As described above, the one or more ferromagnetic elements may reach saturation of induction at magnetic field strengths well below typical MRI magnetic field strengths. The one or more ferromagnetic elements of the present disclosure may have a saturation induction $B_S$ of 1.5 T or less and may therefore be saturated when subjected to an MRI magnetic field. In this case, using a dipole approximation, the magnetic moment, $m_{ferromagnet}$, of the one or more ferromagnetic elements when subject to the relatively strong MRI magnetic field is:

$$m_{ferromagnet} = M_s V_{ferromagnet} = \frac{B_s}{\mu_0} \cdot V_{ferromagnet},$$

where $\mu_0$ is the permeability of free space, $M_S$ is the magnetisation of the one or more ferromagnetic elements at saturation, and $V_{ferromagnet}$ is the total volume of ferromagnetic material. Advantageously therefore, in accordance with the present disclosure, the magnetic moment of the one or more ferromagnetic elements in an MRI field is limited by saturation of induction at the $B_S$ of the ferromagnetic elements. The magnetic moment of the one or more ferromagnetic elements may further be minimised by minimising the volume of ferromagnetic material used, in accordance with the disclosure of United Kingdom patent application no. 2115827.4. By way of example, the total magnetic moment of the one or more ferromagnetic elements may be of the order of about $2 \times 10^{-6}$ A·m$^2$ under an MRI field of 1.5 T.

When subject to an MRI magnetic field, the induced magnetic moment of the at least one diamagnetic element may also be significant, given the cap on the magnetisation of the one or more ferromagnetic elements owing to their saturation and the considerably greater volume of diamagnetic material used in the at least one diamagnetic element. The magnetic moment per unit volume of the at least one diamagnetic element will typically still be much weaker than that of the one or more ferromagnetic elements, but a significant volume of diamagnetic material relative to the volume of the ferromagnetic material may produce a magnetic moment that significantly negates the magnetic moment of the ferromagnetic material. When subject to a typical MRI field, the magnetic moment, $m_{diamagnet}$, from the at least one diamagnetic element is:

$$m_{diamagnet} = \frac{B_{MRI}}{\mu_0} \cdot \chi_{app,diamagnet} \cdot V_{diamagnet},$$

where $\chi_{app,diamagnet}$ is the apparent susceptibility of the at least one diamagnetic element.

By way of example, the total magnetic moment of the at least one diamagnetic element under an MRI field of 1.5 T may be of the order of about $-1 \times 10^{-6}$ A·m$^2$, where the negative sign indicates that the magnetic moment is in the opposite direction to the MRI field.

As the magnetic moment from the at least one diamagnetic element opposes the magnetic moment of the one or more ferromagnetic elements, the magnetic moment from the at least one diamagnetic element reduces the net magnetic moment of the marker as a whole when subject to an MRI field. The marker may suitably therefore have a net magnetic moment of less than about $1 \times 10^{-6}$ Am$^2$ when subjected to an MRI magnetic field. In particular, the marker may have a net magnetic moment of less than about $1 \times 10^{-6}$ Am$^2$ when subjected to a magnetic field of between 0.5 T and 7 T; preferably between about 1 T and 5 T; more preferably between about 1.5 T and 3 T.

Figure 4:
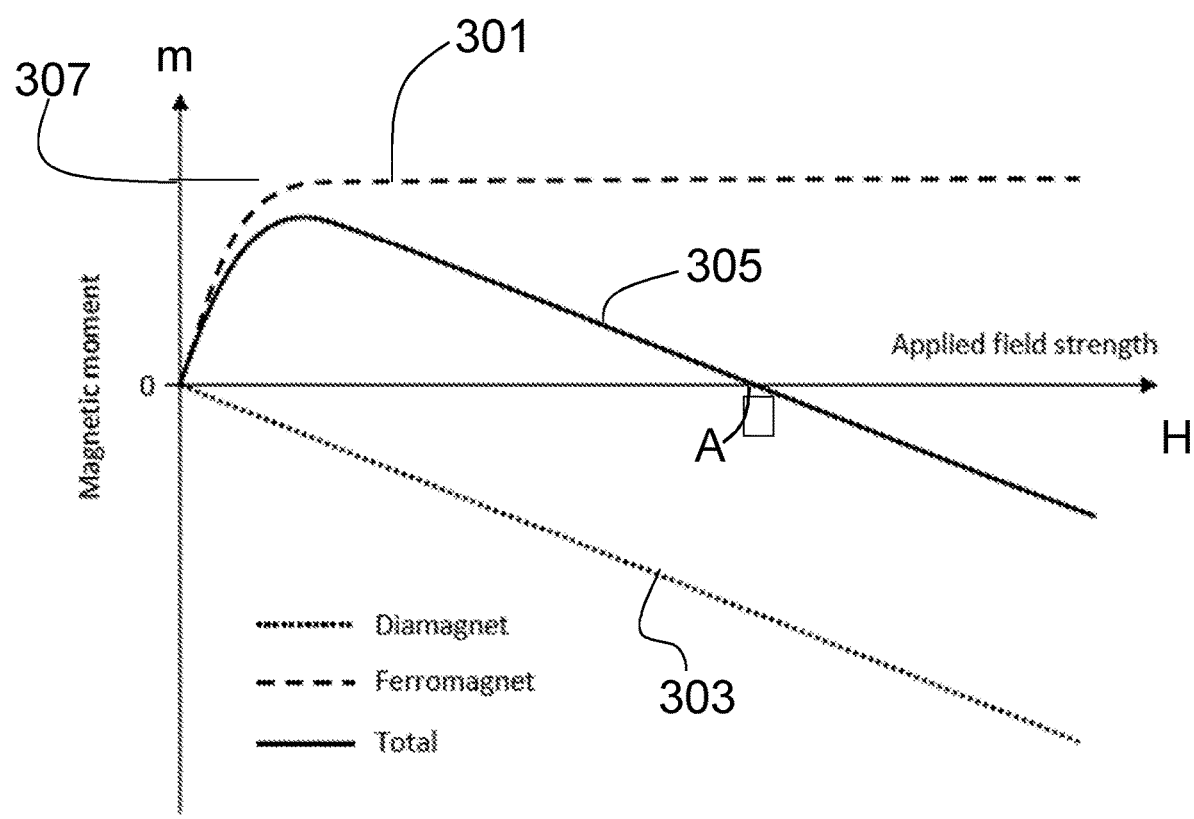
FIG. 4 shows schematically the variation in magnetic moment with applied magnetic field for a marker comprising at least one ferromagnetic element and at least one diamagnetic element according to an embodiment of the present disclosure.

FIG. 4 shows schematically the variation in magnetic moment with applied magnetic field H for a marker comprising one or more ferromagnetic elements and at least one diamagnetic element according to an embodiment of the present disclosure. Magnetic moment as a function of applied field is shown for the one or more ferromagnetic elements 301, the at least one diamagnetic element 303, and the total magnetic moment of the marker 305. At intermediate magnetic field strengths, below the strength of a typical MRI field, but above the strength of a sensing field, the one or more ferromagnetic elements have reached saturation 307 and the magnetic moment of the one or more ferromagnetic elements, $m_{ferromagnet}$, is relatively high. Meanwhile, the at least one diamagnetic element has an opposing magnetic moment that under a sensing field is very substantially smaller than the magnetic moment of the one or more ferromagnetic elements, but that increases linearly with applied field. At such intermediate fields, the magnetic moment of the one or more ferromagnetic elements still dominates the total magnetic moment, $m_{marker}$, 305, but at greater field strengths of the kind used in MRI scanners, the opposing magnetic moment of the at least one diamagnetic element may represent a substantial proportion of the larger magnetic moment of the one or more ferromagnetic elements; for example, at least 25%, preferably at least 50%.

In some embodiments, at a certain applied magnetic field strength, indicated by point A, the amplitude of the (negative) magnetic moment of the at least one diamagnetic element may be substantially equal to the (positive) magnetic moment of the at least one ferromagnetic element, and therefore the total, or net magnetic moment of the marker may be zero or close to zero. At even higher applied magnetic fields, the amplitude of the magnetic moment of the at least one diamagnetic element may even be larger than the amplitude of the magnetic moment of the one or more ferromagnetic elements, and the total, or net magnetic moment of the marker may be negative.

Given the constraints on the marker of the present disclosure in terms of its size and shape and the magnetic properties of available materials, the need to co-locate the magnetic dipoles induced within the one or more ferromagnetic elements and at least one diamagnetic element such that they coincide to cancel each out, at least to some degree, and the strength of the MRI magnetic field, it will be understood that in practice the magnetic moments of the one or more ferromagnetic elements and the at least one diamagnetic element may not cancel each other out completely. However, the object of the present disclosure may be satisfied as long as the magnetic moments of the one or more ferromagnetic elements and the at least one diamagnetic element offset one another sufficiently to reduce the artefact caused by the marker under MRI to an acceptable size; preferably less than about 30 mm in its longest dimension, more preferably less than 25 mm, and even more preferably less than about 20 mm.

Thus, in an MRI magnetic field, a smaller one of the opposing magnetic moments generated by the one or more ferromagnetic elements or, respectively, the at least one diamagnetic element may have an amplitude of at least 25%, preferably at least 50%, of the amplitude of a larger magnetic moment produced by the at least one diamagnetic element or, respectively, the one or more ferromagnetic elements. In some embodiments, the magnetic moment generated by the at least one diamagnetic element in an MRI field may have an amplitude of at least 27% of the amplitude of the larger magnetic moment produced by the one or more ferromagnetic elements; preferably at least 50% of the amplitude of the magnetic moment produced by the one or more ferromagnetic elements.

When subjected to an MRI field, the one or more ferromagnetic elements produce an artefact on an MRI image where the element causes a local change in the magnetic field in an MRI machine. The artefact is predominantly caused by the component of the magnetic flux produced by the ferromagnetic element $B_y$ that is in the same direction as the main field produced by the MRI machine (referred to herein as the y-axis). The effect of $B_y$ is to shift the local Larmor frequency of protons in tissue near the marker, and if that shift is large enough, those protons will not appear in the correct slice reconstructed by the MRI machine. That is, points at which $|B_y| \geq B_{crit}$ do not appear in the expected slice, where $B_{crit}$ is the magnitude of the y-component of the magnetic flux density B at which a voxel is mapped to a different slice, and the value of which depends on MRI scanning parameters.

The amount of ferromagnetic material, the saturation induction $B_S$ and the size and shape of the one or more ferromagnetic elements affect the size of the artefact. At distances that are large compared to the size of the one or more ferromagnetic elements, the magnetic flux density produced by the one or more ferromagnetic elements can be approximated by the dipole model. Along the axis of magnetisation, under that model, the magnetic flux density produced by the ferromagnetic element is given by:

$$B_y = \frac{\mu_0 m_{ferromagnet}}{2\pi y^3}$$

where $m_{ferromagnet}$ is the magnetic dipole moment of the one or more ferromagnetic elements and y is the distance from the object to the point of interest. As explained above, the magnetic moment, $m_{ferromagnet}$ of the one or more ferromagnetic elements in an MRI field is given by:

$$m_{ferromagnet} = M_s V_{ferromagnet} = \frac{B_s}{\mu_0} \cdot V_{ferromagnet}.$$

Combining these two equations, $$B_{ferromagnet,MRI} = \frac{B_s V}{2\pi y^3}$$

where $B_{ferromagnet,MRI}$ is the field produced by the one or more ferromagnetic elements in an MRI field. From this equation, it can be seen that when the marker is placed in an MRI machine and therefore is subject to a strong field, the strength of the magnetic field from the one or more ferromagnetic elements is dependent on the total volume of ferromagnetic material, its saturation induction and the distance away from it.

If one considers the edge of an MRI artefact, then at that point:

$$B_{ferromagnet,MRI} = B_{crit}$$

and y describes the distance from the centre of the artefact to its edge. At that point, using the equation above, one obtains:

$$y^3 = \frac{B_s V}{B_{crit} 2\pi}$$

and so:

$$y = \left(\frac{B_s}{B_{crit}} \cdot \frac{V}{2\pi}\right)^{\frac{1}{3}}$$

where $B_{crit}$ is an MRI scanning parameter defining the critical field at which an artefact is produced. If one defines the "diameter" of an artefact along the y-axis (although it may not be circular) as a measure of its extent as $D_{artefact,y}=2y$, then it follows that $$D_{artefact,y} = 2\left(\frac{B_s}{B_{crit}} \cdot \frac{V}{2\pi}\right)^{\frac{1}{3}}.$$

In accordance with the present disclosure, the size of the artefact generated by the marker may be reduced by the presence of the at least one diamagnetic element, because the net magnetic moment of the marker is at least reduced by the presence of the at least one diamagnetic element. For the marker as a whole, when subject to an MRI field, the size of the artefact generated can be calculated as follows. As:

$$m_{total} = m_{ferromagnet} - m_{diamagnet} = \frac{B_s}{\mu_0} \cdot V_{ferromagnet} - \frac{B_{MRI}}{\mu_0} \cdot \chi \cdot V_{diamagnet}$$

the total diameter of the artefact generated by the marker is given by:

$$D_{total,artefact,y} = 2\left(\frac{m_{total}}{B_{crit}} \cdot \frac{\mu_0}{2\pi}\right)^{\frac{1}{3}} = 2\left(\frac{1}{2\pi B_{crit}} \cdot (B_S V_{ferromagnet} - B_{MRI} \cdot \chi \cdot V_{diamagnet})\right)^{\frac{1}{3}}.$$

From this equation, it can be seen that in order to reduce or minimise the diameter of the artefact generated by the marker, $B_{MRI} \cdot \chi \cdot V_{diamagnet}$ needs to be comparable to $B_s \cdot V_{ferromagnet}$. Considering typical example values, if $B_{MRI}=1.5$ T, $B_S=0.6$ T, and $\chi=5\times10^{-4}$ then the volume of the at least one diamagnetic material would need to be at least about 1000 times greater than the volume of the one or more ferromagnetic elements in order to minimise the diameter of the artefact. However, as discussed in more detail below, the volume of diamagnetic material required to balance the magnetic moment of the one or more ferromagnetic elements will be smaller under a stronger MRI field, e.g. 3 T. In some embodiments, a volume of diamagnetic material that is less than about 10,000 times, for example less than 5,000 times or less than 2,500 times, e.g. about 1,000 times, greater than the volume of the one or more ferromagnetic elements may be suitable.

Large artefacts produced during MRI imaging are problematic and can lead to mismapping of spatial information. It is therefore important to minimise the size of the artefact generated by the marker in MRI magnetic fields, whilst still enabling the marker to be sensed in sensing fields.

In order for the marker to be sensed in sensing fields, the magnetic moment of the one or more ferromagnetic elements should dominate the net magnetic moment when the marker is subject to a sensing field.

In order for the artefact produced by the marker to be relatively small in typical MRI magnetic fields, the magnetic moment of the at least one diamagnetic element should at least partially offset the magnetic moment of the one or more ferromagnetic elements, such that the net magnetic moment of the marker is as small as possible. Additionally, the size and shape of an artefact generated by the one or more ferromagnetic elements alone should at least approximate the size and shape of an artefact generated by the at least one diamagnetic element alone, so that when combined together in close proximity within the marker they overlap and thus offset one another at least to some degree as described herein.

The size of the artefact generated by the markers of the present disclosure when subject to an MRI field is dependent upon the volume and shape of the one or more ferromagnetic elements and the volume and shape of the at least one diamagnetic element. Using a large volume of ferromagnetic material may lead to undesirably large artefacts. Increasing the volume of diamagnetic material may lead to a smaller artefact.

However, if a volume of diamagnetic material were to be used that was much greater than was required to offset the volume of ferromagnetic material, then a "negative" artefact generated by the at least one diamagnetic element may dominate over the artefact generated by the one or more ferromagnetic elements, and this may lead to an undesirable increase in the marker artefact size. It may therefore be desirable to optimise the volume ratio between the one or more ferromagnetic elements and the at least one diamagnetic element to reduce the size of the marker artefact size for a given MRI field strength.

As the size of the artefact generated in MRI magnetic fields is also dependent upon the $B_S$ of the one or more ferromagnetic elements, a greater volume of ferromagnetic material may be used if a ferromagnetic material with a lower $B_S$ is used. In some embodiments, the ferromagnetic material may have a $B_S$ in the range 0.25 T to 1.5 T.

The volume of diamagnetic material required to offset the magnetisation of the one or more ferromagnetic elements in an MRI field may depend on the strength of the MRI field. In particular, a smaller volume of diamagnetic material may be required to offset the saturated magnetisation of the one or more ferromagnetic elements in a stronger field. MRI scanners are available with different MRI field strengths, which means that the opposing magnetic moments of a marker comprising one or more ferromagnetic elements and at least one diamagnetic element may be of substantially equal magnitude under an MRI field of one strength, but unequal in a different MRI field. Suitably, the respective volumes of ferromagnetic and diamagnetic material in the marker of the present disclosure may give rise to MRI artefacts of acceptable sizes across a range of MRI fields; for example 0.5-10 T, preferably 1-7 T, and more preferably 1.5-3 T.

In some embodiments, the respective volumes of ferromagnetic and diamagnetic material in the marker may be such as to generate magnetic moments of substantially equal amplitude under one MRI field, e.g. 1.5 T, thereby to minimise the artefact size, while still giving rise to an acceptably small artefact under a different MRI field, e.g. 3 T. Preferably, in order to minimise the volume of material used in the marker, the amount of diamagnetic material present may be such that the amplitude of the magnetic moment generated by the at least one diamagnetic element is substantially equal to the amplitude of the magnetic moment generated by the one or more ferromagnetic elements under a first MRI field, e.g. 3 T, while still producing an artefact of acceptable size under a second MRI field, e.g. 1.5 T, which is weaker than the first MRI field.

In some embodiments, the respective volumes of ferromagnetic and diamagnetic material in the marker may be such as to generate magnetic moments of different amplitudes at two or more different MRI fields, but the artefact size under each different MRI field is of acceptable size. Thus, in some embodiments, the marker may comprise relative amounts of ferromagnetic and diamagnetic materials such that the opposing magnetic moment generated by at least one of them is within about 75% of the other under at least two different MRI fields; preferably within about 50% of the other. In this sense, the respective amounts of ferromagnetic and diamagnetic material in the marker may be optimised to target an acceptably small artefact under two or more different MRI fields; particularly in the range about 0.5-10 T, preferably 1-5 T, e.g. at 1.5 T and 3 T. The shape and dimensions of the or each ferromagnetic element and the at least one diamagnetic element may also influence the size and shape of the artefact and the case with which the marker can be sensed.

As disclosed in United Kingdom patent application no. 2115827.4, for a given volume of ferromagnetic material, a ferromagnetic element that has a large aspect ratio may be more readily detectable in sensing fields. Increasing a magnetic element's aspect ratio (L/D, e.g. where L is the length of the element and D is its diameter or width or square root of cross-sectional area in the case of an element having a non-circular section) may increase its sense performance in the direction of its longer axis. As the ratio L/D increases, so does the apparent permeability $\mu_{app}$ of the element, which in turn may increase the distance at which it may be sensed. This phenomenon is due to the demagnetisation effect.

Suitably, the or each of the one or more ferromagnetic elements may comprise at least one wire or strip. The wire may comprise a cylindrical wire with a generally circular cross-section. Alternatively, the wire may be a flat wire or a strip. The one or more ferromagnetic elements may comprise a plurality of wires and/or strips.

In some implementations, one or more ferromagnetic elements in the form of multiple wires or strips may be configured to define a tortuous path or paths, either individually or in combination, extending in several different directions and/or including twists, bends, or turns in order to optimise the isotropy of the magnetic response of the marker as described herein and in UK patent application no. 2115827.4.

The one or more ferromagnetic elements of the marker of the present disclosure may suitably have a length to diameter (or width/square root of cross-sectional area) (L/D)) ratio of at least 50, preferably at least about 650 or at least about 1000.

The one or more ferromagnetic elements may suitably have a total volume of less than $1\times10^{-10}$ m$^3$; preferably less than about $5\times10^{-11}$ m$^3$, as described above.

Unless explicitly stated otherwise, the term "length" as used herein in the context of an individual magnetic element means the length of the element as if the element were extended in a linear manner. For example, in the case of a helical ferromagnetic element, the length of the element is the length of a wire forming the helix. By contrast, the phrase "overall length" is used herein, unless stated otherwise, to mean the length of one or more magnetic elements in the configuration in which it or they are formed within the marker. In the latter context, "length" generally refers to the size of the one or more elements in the direction of the longest dimension of the marker. Meanwhile, "overall diameter" or "overall width" means the diameter or width, respectively, of one or an assembly of more than one magnetic elements in a direction transverse the longest dimension.

A ferromagnetic element with a high aspect ratio and a low volume seeks to balance a useful sensing response with an acceptably small MRI artefact: reducing the volume of the ferromagnetic material may reduce the MRI artefact created by the ferromagnetic element. Meanwhile, increasing the aspect ratio of the at least one ferromagnetic element for a given volume of ferromagnetic material may improve the sensing response of the marker.

In some embodiments, the aspect ratio of the or each ferromagnetic element may be at least 100, at least 200, at least 300, at least 400, at least 500, at least 650, or at least 750. In some embodiments, the aspect ratio of the or each ferromagnetic element may be at least 1000, at least 2000 or at least 3000. This allows for the sensing response to be maintained while the volume of the ferromagnetic material, and hence the MRI artefact size, is reduced. In some embodiments, the one or more ferromagnetic elements may have a total volume of less than $1\times10^{-11}$ m$^3$.

Increasing a ferromagnetic element's material's aspect ratio may dramatically increase its sense performance in the direction of its longest dimension. As the aspect ratio increases, so does the apparent permeability $\mu_{app}$ of the marker, which in turn increases the distance at which it can be sensed as a result of the demagnetisation effect.

A straight ferromagnetic wire has a high aspect ratio and produces a strong magnetic flux density in the direction of its longitudinal axis. This may lead to a practical sensing performance in a sensing field in a direction parallel to this axis. However, such an element may be less easy to detect in a direction perpendicular to the longitudinal axis, i.e. it may have an anisotropic sensing response and there may be a wide variation in the magnetic response of the element depending on its orientation to the sensing field, which may make it difficult to calibrate the magnetic response detected by a probe to its proximity to the marker. Using one or more ferromagnetic elements that have a large aspect ratio may result in a good sensing performance using a relatively small volume of ferromagnetic material, which has the benefit of producing a small artefact in an MRI image.

The sensing response under a sensing field and the MRI artefact size of a ferromagnetic element may depend on different variables. It has been recognised that under a sensing field, such as that produced by a Sentimag™ probe, the sense performance may depend almost exclusively on aspect ratio and volume of ferromagnetic material, with a weaker dependence on the initial relative permeability, $\mu_{r,i}$ (the initial gradient of the B-$\mu_0$H curve). By contrast, the magnitude of magnetic field produced by a ferromagnetic element when subjected to an MRI field, and hence the MRI artefact size, may depend on the saturation induction $B_S$ and volume of ferromagnetic material. This means that it is possible to limit the size of the MRI artefact by using a very thin piece of low-saturation-induction ferromagnetic material which may still be sensed at a satisfactory distance.

It has been found that a coiled ferromagnetic wire may have a more isotropic response in a sensing field than a straight wire, whilst still having a low volume and a high aspect ratio. A coiled ferromagnetic wire may therefore lead to an acceptably small artefact in an MRI field, whilst being detectable in a sensing field from an improved range of directions with less variation in its magnetic response with orientation to the sensing field.

In some embodiments therefore, the one or more ferromagnetic elements may comprise a coiled ferromagnetic wire or strip, or multiple spaced apart rings, which may be mutually substantially coaxial. Optionally, the one or more ferromagnetic elements may further include one or more straight rods extending through the coil or rings. In some implementations, at least one ferromagnetic element may comprise a helical wire coil.

In some embodiments, the one or more ferromagnetic elements may comprise at least one single helix; optionally combined with one or more straight wires arranged substantially parallel to a longitudinal axis of the helix.

In some embodiments, two or more of the ferromagnetic elements may be configured as a multiple helix, e.g. a double helix, triple helix or quadruple helix.

For a ferromagnetic element having the form of a single helix in combination with one or more ferromagnetic element having the form of straight wires or strips aligned substantially parallel to a longitudinal axis of the helix, a transverse magnetic response of the marker may result predominantly from the helix, and a longitudinal response may result predominantly from the one or more straight wires or strips.

Where the marker comprises more than one ferromagnetic element, individual ferromagnetic elements may be arranged such that they do not contact one another to avoid destructive interaction between the elements. In some embodiments, the ferromagnetic elements may be held apart by one or more spacers or by being secured to the at least one diamagnetic element or to another component of the marker; for example a housing or other non-magnetic support. Thus, in a multiple helix arrangement, for example, each individual helical ferromagnetic element may be arranged within a helical gap defined by the turns of one or more other helical ferromagnetic elements.

It has been found that the shape and size of an MRI artefact produced by a coiled magnetic wire may depend on the coil pitch and/or coil diameter of the wire. A greater pitch may typically produce a longer, thinner artefact, while a shorter, wider coil may typically produce a thicker, shorter artefact.

Suitably, the wire may have a diameter of less than about 100 µm, 50 µm, 30 µm, 15 µm, or 10 µm; preferably the wire may have a diameter of about 15 µm.

A helical ferromagnetic element formed from a ferromagnetic wire may have a helix diameter (i.e. the diameter of the helix) of between about 0.8 mm to 3 mm; preferably 1.0 mm and 1.5 mm; more preferably between about 1.15 mm and 1.30 mm. It has been found that a larger coil diameter may generate a stronger transverse sensing response in a sensing field.

Suitably, a helical ferromagnetic element may have a pitch of between about 0.5 mm and 3 mm; preferably about 1.0-2.0 or 1.0-1.5 mm, e.g. about 1.6 mm. A greater pitch may improve the sensing response of the helix in its axial direction. It is thought that this may be because a greater length of the helical coils projects in the axial direction.

Suitably, the pitch of the helix may be approximately equal to the diameter of the helix. In some embodiments, the pitch of the helix may be between 1.0-2.0 or 1.0-1.5 times the diameter of the helix, e.g. about 1.33 times. This may serve to maximise the transverse response of the helix in sensing fields.

Decreasing the pitch of a helical ferromagnetic element and increasing the number of turns may increase the transverse sensing performance of the marker, but may decrease its axial sensing performance. These may also increase the total length of wire used, which may increase the MRI artefact size for a given gauge of wire. Meanwhile, increasing the pitch and decreasing the number of turns of a helical ferromagnetic element may decrease the transverse sensing performance of the marker, but may increase its axial sensing performance. It may also decrease the total volume of wire used for a given wire gauge, which may serve advantageously to decrease the MRI artefact size of the marker. It has been found that there may be an optimum pitch to produce an isotropic sensing performance for each type of multiple helix marker. For a triple helix, a pitch of about 2.0 mm for each individual helix may be optimum for about a 1.15 mm diameter marker using about a 15 µm metal wire.

In some embodiments, the one or more ferromagnetic elements may comprise at least one helical ferromagnetic element having a helix length (i.e. the end-to-end length of the helix) of between about 2 mm and 10 mm; preferably between about 6 mm and 8 mm, e.g. about 4 mm or about 5 mm. It has been found that a longer helix may increase the aspect ratio of the marker and may result in an improved sensing response. Suitably, the helical ferromagnetic element may be formed from a wire having a total length of at least about 3 mm, 6 mm, 10 mm, 30 mm, 50 mm, or 100 mm.

As described above, the at least one diamagnetic element may be configured and arranged to minimise the net magnetic moment of the marker in an MRI magnetic field. The at least one diamagnetic element may produce a "negative" artefact in an MRI field. The artefact produced by the at least one diamagnetic element may be calculated to reduce the size of the artefact generated by the marker as a whole, preferably at two or more MRI field strengths, as described above. Suitably, the at least one diamagnetic element may be configured and arranged to create an "inverse" artefact in an MRI field that has a similar shape and size to the artefact created by the one or more ferromagnetic elements.

For the at least one diamagnetic element most effectively to cancel out the field from the one or more ferromagnetic elements and therefore reduce the size of the resulting MRI artefact, the ferromagnetic and diamagnetic elements should therefore (i) produce fields of similar strength (but in opposite directions) in an MRI field; and (ii) be co-located as closely as possible.

Objective (i) above may be achieved in accordance with the present disclosure by using respective volumes of ferromagnetic and diamagnetic materials as disclosed herein, such that the two induced field strengths in an MRI field are similar. As disclosed herein, the at least one diamagnetic element may typically comprise a significantly greater volume of material than the one or more ferromagnetic elements. Using a significantly larger volume of diamagnetic material as compared with the total volume of ferromagnetic material means that the total magnetic moment of the marker and therefore the size of the artefact produced by the marker may be reduced.

The volume of the at least one diamagnetic element may be about 100 to 10,000 times greater than the total volume of the one or more ferromagnetic elements; preferably about 500 to 3,000 times greater than the total volume of the one or more ferromagnetic elements; e.g. about 1,000 times.

The total volume of the ferromagnetic material forming the one or more ferromagnetic elements may be less than $5 \times 10^{-11}$ m$^3$, $3 \times 10^{-11}$ m$^3$ or $1 \times 10^{-11}$ m$^3$.

Typically, the volume of the at least one diamagnetic element may be between about $1 \times 10^{-9}$ m$^3$ and $1.5 \times 10^{-7}$ m$^3$.

Objective (ii) may be achieved by distributing the one or more ferromagnetic elements and at least one diamagnetic element in space in similar ways. Generally, the field produced by a given volume of diamagnetic material may be weaker than that produced by the same volume of ferromagnetic material, so a greater volume of diamagnetic material is necessary. Because of this, and because it may not be possible to co-locate the two materials perfectly, the fields generated by the two materials may not typically cancel one another out perfectly in an MRI field. It may be most beneficial to match the dipole components of the two fields, while matching higher-order components (quadrupole, octupole, etc.) may yield diminishing returns. Suitable configurations and arrangements of the ferromagnetic and diamagnetic elements may be determined empirically by using a suitable computer mathematical modelling program to produce contour maps of the magnetic flux changes that would be produced individually in an MRI field by the one or more ferromagnetic elements and at least one diamagnetic element and iteratively adjusting the configuration and arrangement of the elements until the contour maps substantially match. The shape and size of an artefact produced by one or more pieces of ferromagnetic or diamagnetic material in an MRI field may be represented by a contour line for $B_{crit}$ which, as mentioned above, for a given MRI field is the magnitude of the y-component of the change in magnetic flux density B at which a voxel is mapped to a different slice owing to the presence of the one or more pieces in the field.

The one or more ferromagnetic elements and at least one diamagnetic element may suitably be juxtaposed one another within a common space which may be defined by the one or more ferromagnetic elements and/or the at least one diamagnetic element. As described above, this may be specially advantageous where graphite having a substantially isotropic grain structure is used as the diamagnetic material, as the proximity of the one or more ferromagnetic elements has surprisingly been found to increase the apparent susceptibility of the graphite. Suitably, the one or more ferromagnetic elements and the at least one diamagnetic element may be configured and arranged such that a centre, e.g. a box centre (i.e. the centre of a notional rectangular box that fits as closely as possibly around an object) or geometric centre, of a theoretical artefact generated by the one or more ferromagnetic elements coincides with a centre, e.g. a box centre or geometric centre, of a theoretical artefact generated by the at least one diamagnetic element. In some embodiments, a centre of mass of the one or more ferromagnetic elements may substantially coincide with a centre of mass of the at least one diamagnetic element.

In some implementations, at least one ferromagnetic element may extend along or around an outer surface of the at least one diamagnetic element. In some implementations, at least one ferromagnetic element may be wrapped around the at least one diamagnetic element.

Conveniently, the at least one diamagnetic element may form a core of the marker. The at least one diamagnetic element may comprise an elongate body having an outer surface. Suitably, the elongate body may be substantially cylindrical. The elongate body may form a support or mandrel for at least one of the one or more ferromagnetic elements. In some implementations, at least one of the one or more ferromagnetic wires may be wrapped around the elongate body of the diamagnetic element to form a single or multiple helix, as described above. Alternatively, the at least one diamagnetic element may be disposed juxtaposed a single or multiple helix formed by at least one of the one or more ferromagnetic wires; for example in the form of an elongate rod which extends substantially parallel to a longitudinal axis of the helix or circumjacent the helix in the form of a hollow cylinder.

It has been found that the size of the artefact generated by the marker may advantageously be minimised if the overall length of the one or more ferromagnetic elements is the same as or similar to the overall length of the at least one diamagnetic element, and/or if the overall diameter or width of the one or more ferromagnetic elements is the same or similar to the overall diameter or width of the at least one diamagnetic element.

Suitably, therefore, the one or more ferromagnetic elements may extend individually or collectively along at least 80% of the overall length of the at least one diamagnetic element. In some embodiments, the at least one diamagnetic element may have an overall length of between about 2 mm and 10 mm; preferably between about 4 mm, 5 mm or 6 mm and 8 mm. In some implementations, the overall length of the at least one diamagnetic element may be approximately the same as the overall length of the one or more ferromagnetic elements; for example the helix length where the one or more ferromagnetic elements form a helix. The overall length of the at least one diamagnetic element may be within 5% of the overall length of the one or more ferromagnetic elements. The overall length of the at least one diamagnetic element may be within about 2% of the overall length of the one or more ferromagnetic elements.

Suitably, the marker may be sized to fit within a particular needle gauge; for example between 12G and 18G; preferably between 16G or 18G. In some embodiments, therefore, the marker may have a diameter in the range of about 0.514 mm to about 1.803 mm; preferably between about 0.838 mm and about 1.194 mm. Once the total volumes required for the ferromagnetic and diamagnetic materials have been defined, the proportion of each material within the marker can be calculated. The diameter, length and spatial arrangement of the one or more ferromagnetic elements and at least one diamagnetic element may then be determined based on the available diameter within a particular needle gauge, taking into account the need in some embodiments to accommodate a housing or outer coating for the ferromagnetic and diamagnetic elements.

Generally, the at least one diamagnetic element may have an overall diameter or width of between about 0.03 and 3 mm. Taking into account the internal diameter of a particular needle gauge, as discussed in the previous paragraph, and leaving enough room for a housing or outer coating, in some embodiments, the at least one diamagnetic element may have an overall diameter or width of between about 0.45 mm and 1.8 mm; more preferably between about 0.80 mm and 1.2 mm. It has been found that in many cases, having the overall diameters of the one or more ferromagnetic elements and at least one diamagnetic element as similar to each other as possible may lead to the best artefact size reduction. In some embodiments, the overall diameter of the at least one diamagnetic element may therefore be approximately the same as the overall diameter of the one or more ferromagnetic elements; for example the helical diameter where the one or more ferromagnetic elements form a helix. The overall diameter of the at least one diamagnetic element may be within about 5% of the overall diameter of the one or more ferromagnetic elements. The overall diameter of the at least one diamagnetic element may be within about 2% of the overall diameter of the one or more ferromagnetic elements. However, where a very strong diamagnetic material is used (e.g. pyrolytic carbon) or the wire diameter is very thin, only a small amount of diamagnetic material may be needed to balance the ferromagnetic magnetic moment. In such cases, the overall diameter of the at least one diamagnetic element may be smaller than the overall diameter of the one or more ferromagnetic elements. Preferably, the similarity of the aspect ratio of the diamagnetic material with the one or more ferromagnetic elements will be conserved when the diameter of the diamagnetic element is smaller.

The one or more ferromagnetic elements and the at least one diamagnetic element may therefore be configured and arranged as disclosed herein, such that the artefact produced by the marker in an MRI magnetic field is less than about 30 mm in maximum length, preferably less than about 20 mm in maximum length. The size of the MRI artefact may vary depending on the strength of the MRI field. The artefact produced by the marker in an MRI magnetic fields may be less than 20 mm in length in a field of less than 3 T. The artefact produced by the marker in an MRI magnetic fields may be less than 20 mm in length in a field of less than 5 T. The artefact produced by the marker in an MRI magnetic fields may be less than 20 mm in length in a field of less than 7 T.

For markers according to embodiments of the present disclosure, it may be advantageous as described above for the one or more ferromagnetic elements to have a low saturation induction ($B_S$), for example, less than 1.5 T. Further, the one or more ferromagnetic elements may have a high initial relative permeability; for example greater than 10,000 for magnetic fields of between 0.1 mT and 0.5 mT. In some embodiments, the one or more ferromagnetic elements may have an initial relative permeability of more than 50,000 or even 100,000.

The or each ferromagnetic element may suitably comprise a ferromagnetic metal. At least one ferromagnetic element may comprise an amorphous metal. At least one ferromagnetic element may comprise a ceramic ferrite. Suitable ferromagnetic materials include cobalt-based amorphous metals; for example as sold under the trade names Yshield MCE61™, Metglas 2705M™ and Metglas 2714A™. Suitable ferromagnetic materials also comprise manganese-zinc ceramic ferrites; for example as sold under the trade names Fair-Rites 31™, 76™ and 78™. Suitable ferromagnetic materials further include nickel-iron-based soft ferromagnetic alloys; for example as sold under the trade names Mu-metal, Permalloy 80, Permalloy C, Permalloy and Supermalloy. Other suitable ferromagnetic materials comprise nickel-zinc ceramic ferrites; for example as sold under the trade names Fair-Rites 15™, 20™, and 43™; preferably cobalt-based amorphous metals, such as Yshield™ and Metglas 2714A™. Ceramics, however, while having a low saturation induction, are less easy to form into wire or flat wire and therefore are less suitable for a marker according to the invention. In some embodiments, metallic ferromagnetic materials may be preferred in view of their ductility for drawing into wires having a high aspect ratio and pliability for forming into rings, helices and the like.

In some embodiments, the at least one diamagnetic element may be formed from a diamagnetic material having a negative bulk susceptibility of magnitude greater than about $0.16 \times 10^{-4}$. Graphite for example has a bulk susceptibility of about $-0.16 \times 10^{-4}$. This compares to the susceptibility of water which is about $-0.91 \times 10^{-5}$. Advantageously, however, the at least one diamagnetic element may be strongly diamagnetic, i.e. having a strong negative susceptibility of magnitude more than about $1 \times 10^{-4}$. In some embodiments, the at least one diamagnetic element may have a bulk susceptibility of at least about $-1 \times 10^{-4}$. In some embodiments, the at least one diamagnetic element may have a bulk susceptibility of up to about $-3 \times 10^{-4}$. In some embodiments, therefore, the at least one diamagnetic element may have a bulk susceptibility between about $-0.16 \times 10^{-4}$ and $-3 \times 10^{-4}$. In some embodiments, the at least one diamagnetic element may have a bulk susceptibility of up to about $-7 \times 10^{-4}$. A diamagnetic element having high (negative) susceptibility may be advantageous because it means that less diamagnetic material may be needed to offset the (positive) magnetisation of the one or more ferromagnetic elements in an MRI field.

In some embodiments, the at least one diamagnetic element may comprise graphite. Advantageously, the graphite may have a fine, substantially isotropic grain structure. Isostatically-pressed graphite, for example, may have a higher density, higher strength and finer grain structure than graphite formed from extrusion or compression moulding. Further, isostatically pressed graphite may advantageously have more isotropic magnetic properties than graphite formed from extrusion or by compression moulding. Isostatically-pressed graphite may also be inexpensive, readily machinable, have good biocompatibility characteristics, and be produceable in grades with <300 ppm of impurities. Suitably, therefore, the graphite may be of high purity, containing more than 99.9% carbon. In some embodiments, the graphite may have fewer than 5 ppm impurities. The graphite may have a density of at least about $1.75$ g/cm$^3$, e.g. about $1.85$ g/cm$^3$ which may correspond to a low porosity. In some embodiments, the graphite may have a density of up to about $1.95$ g/cm$^3$. It has surprisingly been found that high purity, high density, isostatically-pressed graphite has an apparent bulk susceptibility of about $-1.2 \times 10^{-4}$ in the presence of one or more juxtaposed ferromagnetic elements.

According to a different aspect, the present disclosure, therefore, comprehends the use of graphite having a substantially isotropic grain structure in an implantable marker comprising one or more ferromagnetic elements for reducing the net magnetic moment of the marker in an MRI field, thereby to minimise the size of an artefact created by the marker. According to this aspect, the implantable marker of the present disclosure may comprise one or more ferromagnetic elements and at least one diamagnetic element which is formed from graphite having a substantially isotropic grain structure, for example by isostatic pressing. Suitably, the graphite may also be of high purity. The graphite may be heat treated; for example, at a temperature of at least about 2,200° C.

In other embodiments, the at least one diamagnetic element may be made of pyrolytic carbon. Pyrolytic carbon is biocompatible and can be machined or deposited directly into a rod. Pyrolytic carbon may have a density in the range of about 2-2.5 g/cm$^3$, e.g. about 2.25 g/cm$^3$. Pyrolytic carbon may have a bulk susceptibility of about $-2.7 \times 10^{-4}$.

In some embodiments, the at least one diamagnetic element may be made of bismuth, which has a bulk susceptibility of about $-1.6 \times 10^{-4}$. Bismuth is non-toxic and can be cast or extruded into a wire.

Other suitable strongly diamagnetic materials may be available to those skilled in the art. For example, the use of diamagnetic metamaterials may allow smaller volumes of diamagnetic material to be used.

According to another aspect, the present disclosure provides a method of manufacturing a magnetic marker. The method may comprise forming one or more ferromagnetic elements and at least one diamagnetic element, and thereafter assembling the one or more ferromagnetic elements with the at least one diamagnetic element to form the marker. The one or more ferromagnetic elements and at least one diamagnetic element may comprise respective volumes of ferromagnetic and diamagnetic materials that are selected as disclosed herein, such that in a sensing field, the one or more ferromagnetic elements are substantially more strongly magnetised than the at least one diamagnetic element, for generating a responding magnetic field of sufficient magnitude to allow the marker to be detected in tissue using a handheld probe, while in an MRI field, the at least one diamagnetic element has a degree of magnetisation which is sufficiently strong to offset at least a substantial proportion of the magnetisation of the one or more ferromagnetic elements, thereby minimising the size of the artefact produced by the marker.

Suitably, the ferromagnetic material may have an initial relative permeability of at least 10,000 and a saturation induction Bs of less than about 1.5 T. The diamagnetic material may have a bulk susceptibility of at least about $-0.16 \times 10^{-4}$.

The one or more ferromagnetic elements may be configured and arranged to maximise the strength and isotropy of a responding field generated in response to the sensing field. The at least one diamagnetic element may be configured and arranged such that it would produce an artefact in the MRI field which has a size and shape that matches the artefact size and shape of an artefact that would be produced by the one or more ferromagnetic elements, at least to a sufficient degree as to reduce to the maximum dimension of the artefact created by the marker to less than about 30 mm; preferably less than about 20 mm.

In yet another aspect of the present disclosure, the method may comprise configuring and arranging the one or more ferromagnetic elements and the at least one diamagnetic element to produce mutually opposing magnetic moments in the presence of an applied magnetic field. The strength of the magnetic moment produced by the at least one diamagnetic element in relation to the strength of the magnetic moment produced by the one or more ferromagnetic elements may be negligible in a sensing field, to allow the magnetic moment produced by the at least one ferromagnetic element to be detected with a probe, and may of the same order of magnitude as the strength of the magnetic moment produced by the one or more ferromagnetic elements in an MRI field, thereby to minimise the size of an artefact produced by the marker on an MRI image by offsetting or substantially balancing the magnetic moment of the at least one ferromagnetic element.

In some embodiments, the at least one diamagnetic element may be formed from graphite having an isotropic grain structure of the kind disclosed herein. Suitably, the graphite may be of high purity and high density as disclosed herein.

In some embodiments, the step of configuring and arranging the one or more ferromagnetic elements and the at least one diamagnetic element may comprise wrapping the one or more ferromagnetic elements around a core or mandrel formed of the at least one diamagnetic element. Thus, in one aspect of the present disclosure there is provided a method for manufacturing a marker comprising a diamagnetic core which is received in a coil of one or more ferromagnetic wires or strips. The core may have an initial length of several times the length of a single marker. The one or more ferromagnetic wires or strips may be wound around the diamagnetic core. The ends of the wires or strips may conveniently be secured to the core, for example using an adhesive, at the start and end of winding. The resulting assembly may then be divided into two or more segments, each segment having a length which corresponds to a length of the marker. The segments may be divided from one another by cutting, e.g. by mechanical, pressure or thermal means; for example with a blade, a water jet or a laser. Alternatively, the diamagnetic core may be cut into separate segments before the coil winding.

Figure 5:
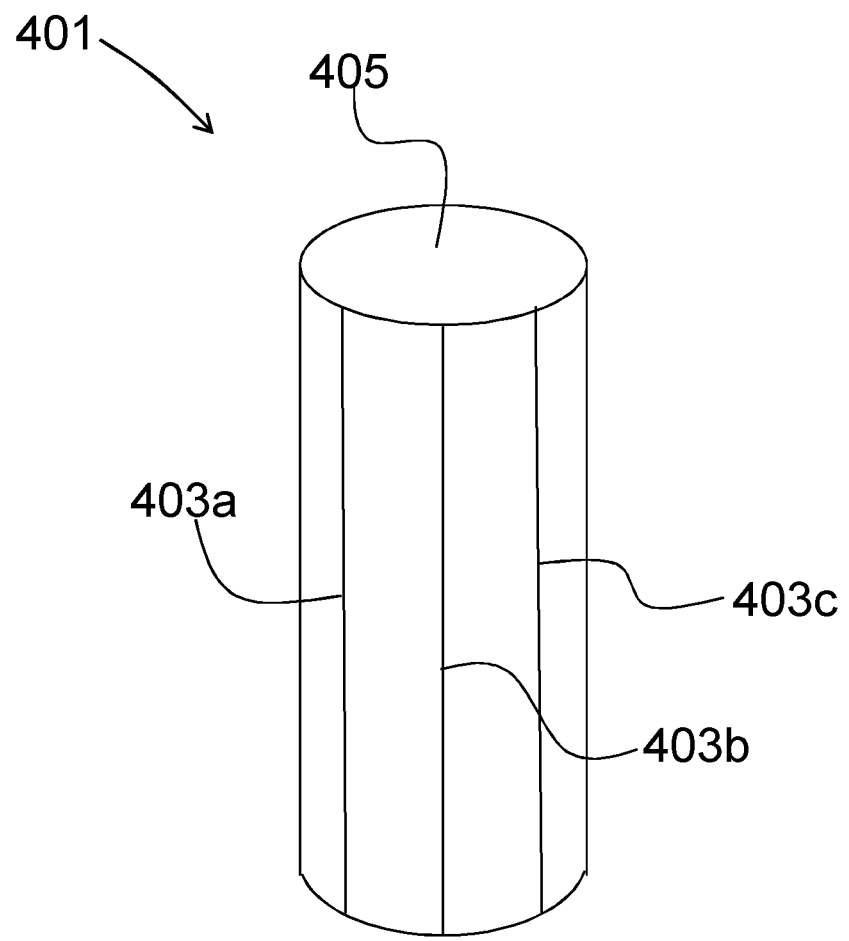
FIG. 5 is a schematic perspective view of an implantable marker comprising a cylindrical diamagnetic core and three spaced ferromagnetic wires which each extend substantially parallel to a longitudinal axis of the core, juxtaposed an outer surface thereof, according to a first embodiment of the present disclosure.

FIG. 5 is a schematic drawing of an implantable marker 401 according to a first embodiment of the present disclosure. The marker 401 comprises three, generally linear ferromagnetic wires formed from an iron-cobalt based alloy 403a, 403b, 403c running along the outside of a diamagnetic core 405. It will be understood that in variants of this embodiment, fewer or more ferromagnetic wires may be used. The diamagnetic core 405 is a cylinder with a bulk susceptibility value of $\chi=-1.66\times10^{-4}$. The cylinder comprises isostatically pressed graphite and has a diameter of about 1 mm and a length of about 8 mm. The ferromagnetic wires 403a, 403b, 403c have an initial bulk susceptibility value of about 72,000. Each wire 403a, 403b, 403c has a diameter of about 16 µm, and a length of about 8 mm, and the wires 403a, 403b, 403c extend in a direction substantially parallel to a longitudinal axis of the core 405, such that the length of the wires substantially matches the length of the diamagnetic core 405. In the presence of the ferromagnetic wires, the diamagnetic core is found to have an apparent bulk susceptibility value of about $-1.2\times10^{-4}$.

In a sensing field of less than about 0.5 mT, the magnetic field generated by each of the wires 403a, 403b, 403c is proportional to the apparent susceptibility of the wire, $\chi_{app,wire}$, multiplied by the volume of the wire, $V_{wire}$, and the magnetic moment generated by the diamagnetic core 405 is proportional to the apparent susceptibility, $\chi_{app,core}$, of the core 405 multiplied by its volume, $V_{core}$. The quantity $\chi_{app,wire} \cdot 3 \cdot V_{wire}$ for the combination of the wires 403a, 403b, 403c may be calculated to be about $4.6\times10^{-8}$ m³, and the quantity $\chi_{app,core} V_{core}$ for the diamagnetic core 405 may be calculated to be about $-1.0\times10^{-12}$ m³. The combined magnetic field generated by the ferromagnetic wires 403a, 403b, 403c in the sensing field is therefore about 45,000 times greater than the magnetic moment generated by the diamagnetic core 405, which is negligible in comparison.

When subjected to an MRI field of 1.5 T, each of the ferromagnetic wires 403a, 403b, 403c has reached saturation of induction. The combined magnetic moment of the three wires 403a, 403b, 403c is thus given by:

$$3m_{ferromagnet} = \frac{3B_s V_{wire}}{\mu_0}$$

where $B_S$ is the saturation induction of the wire, $\mu_0$ is the permeability of free space and $V_{wire}$ is the volume of one of the ferromagnetic wires. In this example, each wire has a $B_S$ value of 0.55 T, and 3 $m_{ferromagnet}$=2.1× $10^{-6}$ Am². The diamagnetic core 405 does not saturate, and its magnetic moment is given by:

$$m_{diamagnet} = \frac{\chi_{app} V_{core} B_0}{\mu_0}$$

where $B_0$ is the MRI field, $\chi_{app}$ is the apparent susceptibility of the diamagnetic core 405, and $V_{core}$ is the volume of the diamagnetic core. For this marker 405, this gives $m_{diamagnet}$=-1.2×$10^{-6}$ Am². Comparing the magnetic moments of the diamagnetic core 405 and the ferromagnetic wires 403a, 403b, 403c under a 1.5 T MRI field, the magnetic moment of the diamagnetic core 405 is about 57% of the the magnetic moment of the ferromagnetic wires 403a, 403b, 403c.

FIG. 6(a) is a contour map 507 showing the deviation $|B-B_0|_y$ in magnetic flux $B_y$ from an MRI field $B_0$ of 3 T across an x-z plane of an MRI scanner, which results from the presence of the marker 401 of FIG. 5 in the MRI field. The contour lines represent lines of constant flux density deviation in the vicinity of the marker 401. As discussed above, $B_{crit}$ is the magnitude of $|B-B_0|_y$ above which a voxel is mapped to an incorrect slice of an MRI image. A contour line at $B_{crit}$ thus represents an outline of an artefact which may be generated in the x-z plane for the marker 401 of FIG. 5 in the MRI field, wherein the axial length of the marker 401 is oriented along the y-axis. It has been found that a value of $B_{crit}$ of 0.6 µT, indicated by contour line 509, gives reasonably good agreement between theoretical predictions and experimental data, but those skilled in the art will appreciate that $B_{crit}$ will depend on the configuration of a particular MRI machine (e.g. slice thickness). FIG. 6(a) therefore shows other contours at different values of $|B-B_0|_y$ to show how the artefact size varies for different values of $B_{crit}$.

For comparison, FIG. 6(b) is a contour map 511 showing the deviation $|B-B_0|_y$ in magnetic flux density $B_y$ which would be generated in the same MRI field $B_0$ for the same configuration of ferromagnetic wires 403a, 403b, 403c in the absence of the diamagnetic core 405. Contour line 513 represents $B_{crit}$=0.6 µT. The effect of the diamagnetic core on reducing the size of the artefact in the x-z plane in FIG. 6(a) is self-evident.

Figure 7:
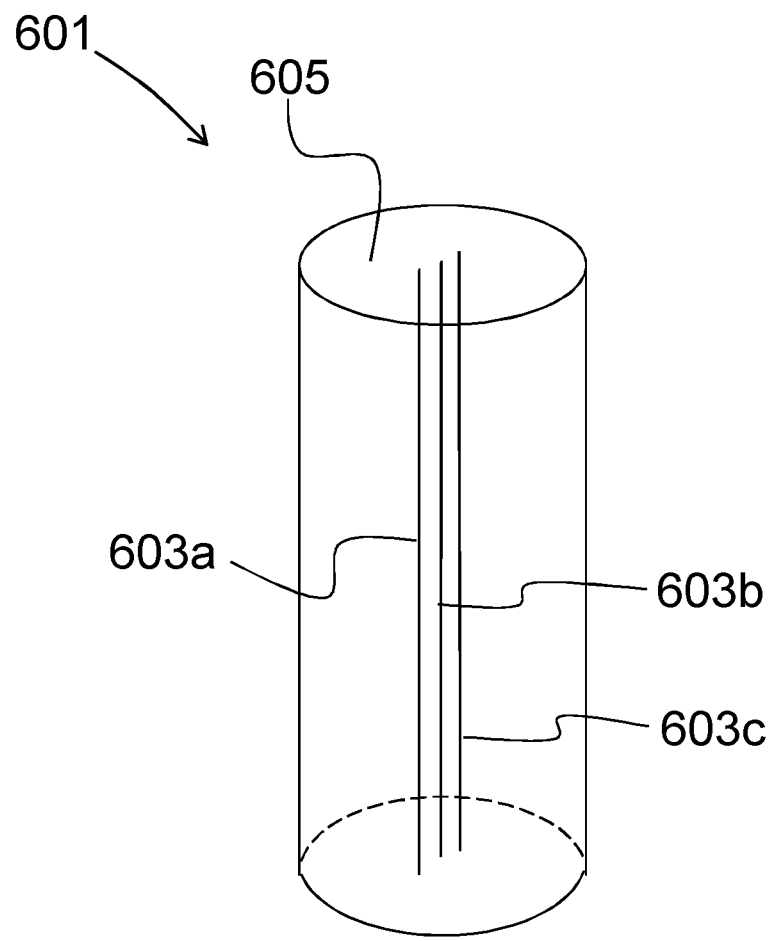
FIG. 7 is a schematic perspective view of an implantable marker comprising a cylindrical diamagnetic core and three spaced ferromagnetic wires which each extend through the diamagnetic core, substantially parallel to its longitudinal axis, according to a second embodiment of the present disclosure.

FIG. 7 is a schematic drawing of a different implantable marker 601 according to a second embodiment of the present disclosure. Similar to the marker 401 of FIG. 5 described above, the marker 601 comprises three ferromagnetic wires 603a, 603b, 603c, although in variants fewer or more wires may be used. However, in this embodiment, the ferromagnetic wires 603a, 603b, 603c extend axially through a diamagnetic core 605. The diamagnetic core 605 is substantially the same size and shape, and has substantially the same properties as the diamagnetic core 405 of FIG. 5. Thus, the core 605 is a cylinder of isostatically pressed graphite with a bulk susceptibility value of $\chi=-1.66\times10^{-4}$. The cylinder has a diameter of about 1 mm and a length of about 8 mm. The ferromagnetic wires 603a, 603b, 603c are substantially the same length and gauge as the wires 403a, 403b, 403c shown in FIG. 5. Thus, the ferromagnetic wires 603a, 603b, 603c have an initial bulk susceptibility value of about 72,000. Each wire 403a, 403b, 403c has a diameter of about 16 µm, and a length of about 8 mm, such that the length of the wires substantially matches the length of the diamagnetic core 405.

Figure 6:
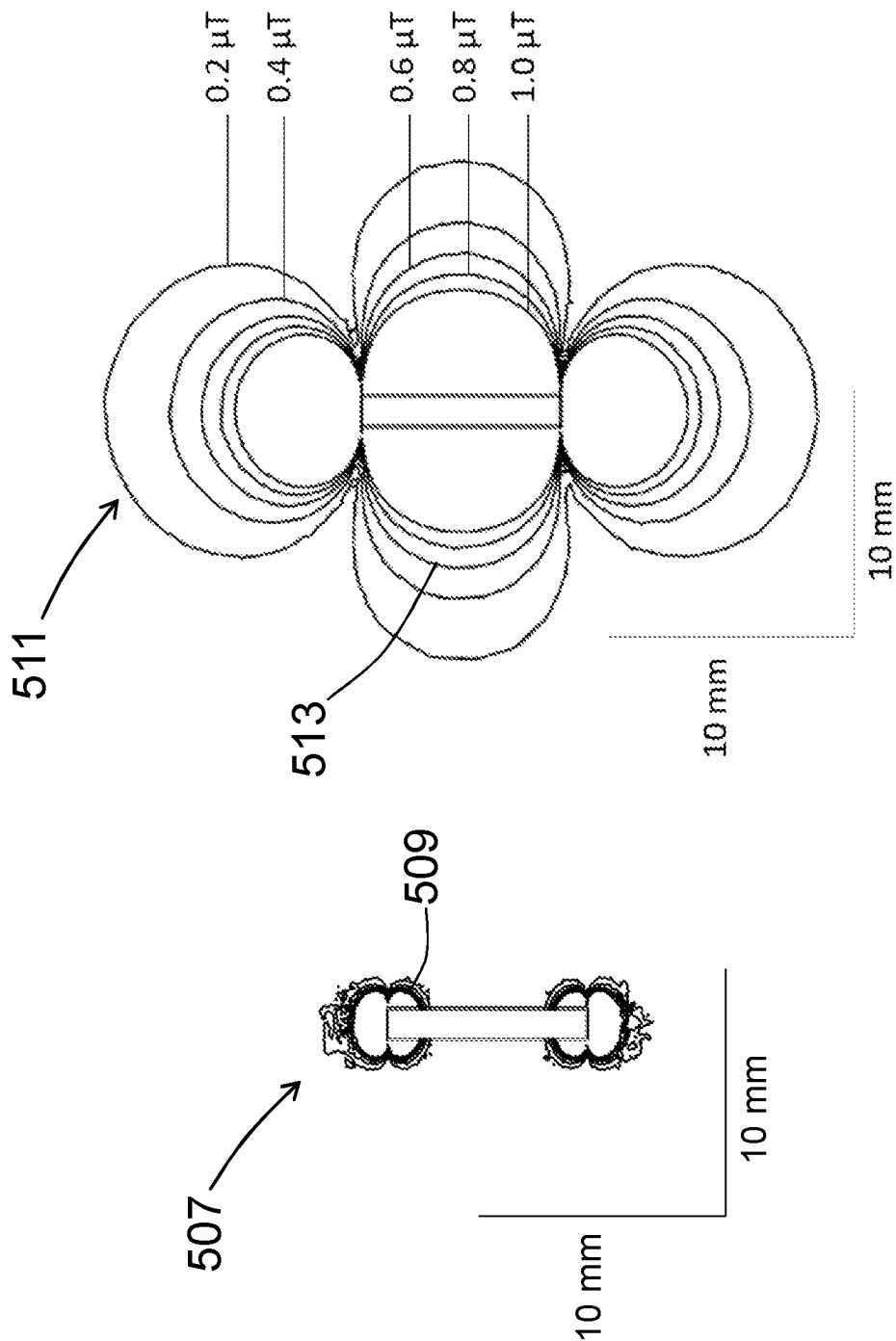
FIG. 6(a) is a contour map of magnetic flux density B in an x-z plane of an MRI scanner of the kind illustrated in FIG. 1(a) and/or FIG. 1(b), which shows how B deviates from an MRI field $B_0$ applied along the y-axis as a result of the presence in the field of the implantable marker of FIG. 5.
FIG. 6(b) is a comparative contour map of magnetic flux density B in an x-z plane of the MRI scanner, which shows how B deviates from an MRI field $B_0$ as a result of the presence in the field of the same configuration of ferromagnetic wires as shown in FIG. 5, but in the absence of the diamagnetic core.
Figure 8:
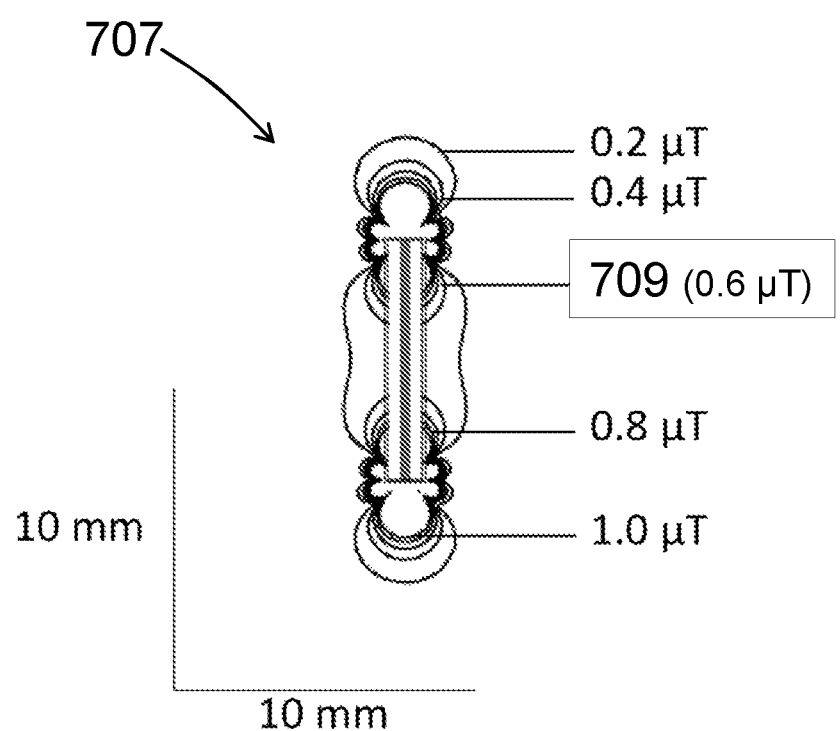
FIG. 8 is a contour map of magnetic flux density B in an x-z plane of an MRI scanner of the kind illustrated in FIG. 1(a) and/or FIG. 1(b), which shows how B deviates from an MRI field $B_0$ as a result of the presence in the field of the implantable marker of FIG. 7.

FIG. 8 is a contour map 707 which is similar to FIG. 6(*a*), showing the deviation $|B-B_0|_y$ in magnetic flux $B_y$ from an MRI field $B_0$ of 3 T across an x-z plane of an MRI scanner which results from the presence of the marker 601 of FIG. 7 in the MRI field, wherein the axial length of the marker 601 is oriented with the y-axis. As in FIGS. 6(*a*) and 6(*b*), a contour line 709 at 0.6 µT, which may correspond to $B_{crit}$, thus represents an outline of an artefact which may be generated in the x-z plane for the marker 601 in the MRI field. By comparing the artefacts of FIG. 6(*a*) and FIG. 8, it can be seen that the overall size and shape of the artefact in the x-z plane does not change significantly depending on whether the ferromagnetic wires 403a, 403b, 403c; 603a, 603b, 603c are disposed outside or inside of the diamagnetic core 405; 605.

Figure 9:
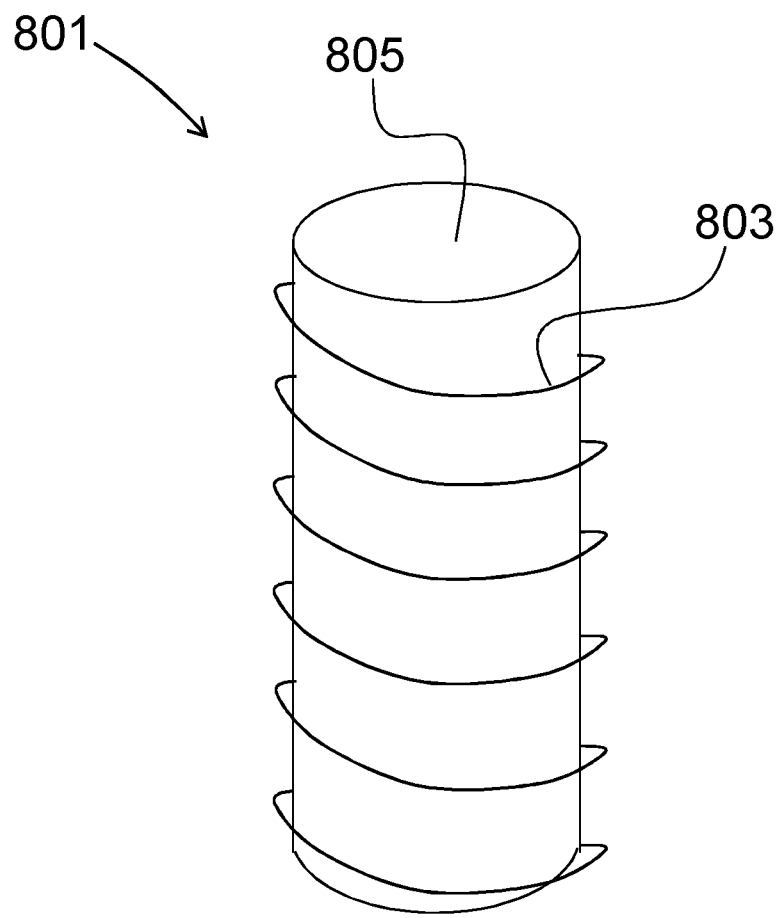
FIG. 9 is a schematic perspective view of an implantable marker comprising a cylindrical diamagnetic core and a ferromagnetic wire helix which extends around an outer surface of the diamagnetic core, according to a third embodiment of the present disclosure.

FIG. 9 is a schematic drawing of another implantable marker 801 according to a third embodiment of the present disclosure. The marker 801 comprises a substantially cylindrical diamagnetic core 805 of isostatically pressed graphite or another suitable diamagnetic material as disclosed herein, having a diameter of about 1.15 mm and a length of about 8 mm. The diamagnetic core 805 has a susceptibility of about $-1.2\times10^{-4}$. The marker 801 further comprises a ferromagnetic element, which consists of a single helical coil of wire 803 of an iron-cobalt based alloy. It will be appreciated that other ferromagnetic materials may be used, as disclosed herein. The wire 803 has a diameter of about 15 µm, and the helix has a length of about 8 mm (i.e. about the same length as the core 805). The helix has a pitch of about 1.2 mm. In variants of this embodiment, a plurality of ferromagnetic wires may be wrapped around the diamagnetic core 805 in the form of a multiple helix, e.g. a double helix or triple helix. This may allow the same amount of wire to be used but with a longer pitch to increase the sensitivity of the marker as disclosed herein.

Figure 10B:
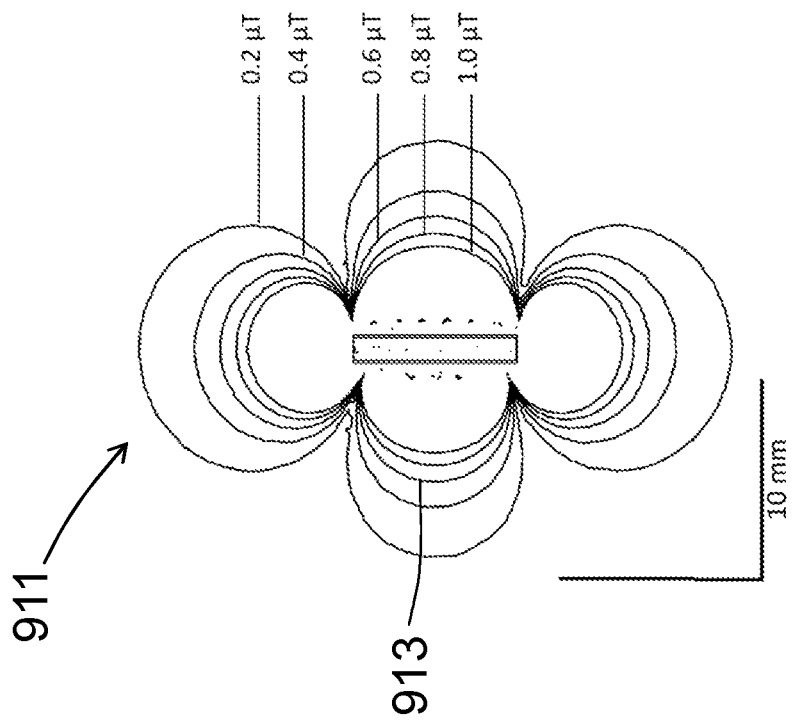
FIG. 10(b) is a comparative contour map of magnetic flux density B in an x-z plane of the MRI scanner, which shows how B deviates from an MRI field $B_0$ as a result of the presence in the field of the same configuration of ferromagnetic wires as shown in FIG. 9, but in the absence of a diamagnetic core.
Figure 10A:
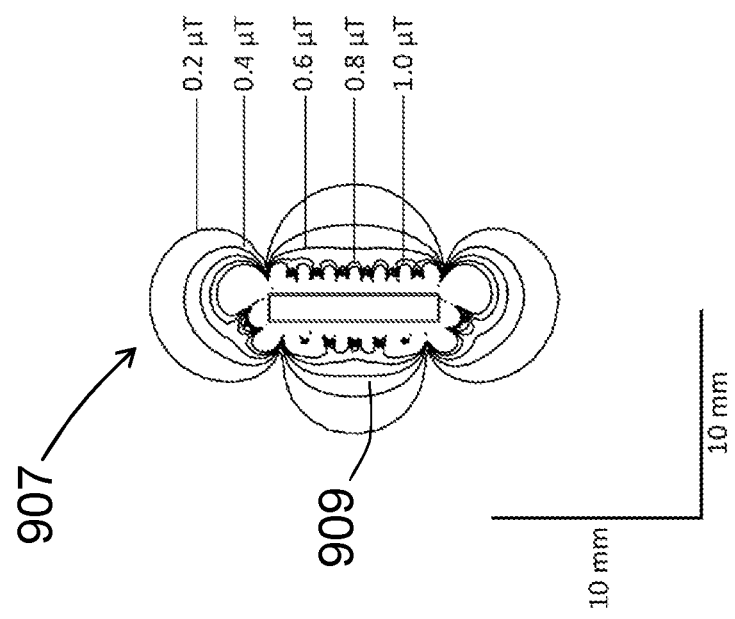
FIG. 10(a) is a contour map of magnetic flux density B in an x-z plane of an MRI scanner of the kind illustrated in FIG. 1(a) and/or FIG. 1(b), which shows how B deviates from an MRI field $B_0$ as a result of the presence in the field of the implantable marker of FIG. 9.

FIG. 10(*a*) is a contour map 907 which is similar to those of FIGS. 6(*a*) and 8, showing the deviation $|B-B_0|_y$ in magnetic flux density $B_y$, from the MRI field $B_0$ of 3 T across an x-z plane of an MRI scanner, which results from the presence of the marker 801 of FIG. 9 in the MRI field, wherein the axial length of the marker 801 is oriented with the y-axis. As in FIGS. 6(*a*), 6(*b*) and 8, a contour line 909 at 0.6 µT, which may correspond to $B_{crit}$, thus represents an outline of an artefact which may be generated in the x-z plane for the marker 801 in the MRI field. For comparison, FIG. 10(*b*) is a contour map 911 showing the deviation $|B-B_0|_y$ in magnetic flux density $B_y$ which would be generated in the same MRI field $B_0$ for the same ferromagnetic helix 803, in the absence of the diamagnetic core 805. Contour line 913 represents $B_{crit}=0.6$ µT. The effect of the diamagnetic core on reducing the size of the artefact in the x-z plane in FIG. 10(*a*) is self-evident.

Figure 11:
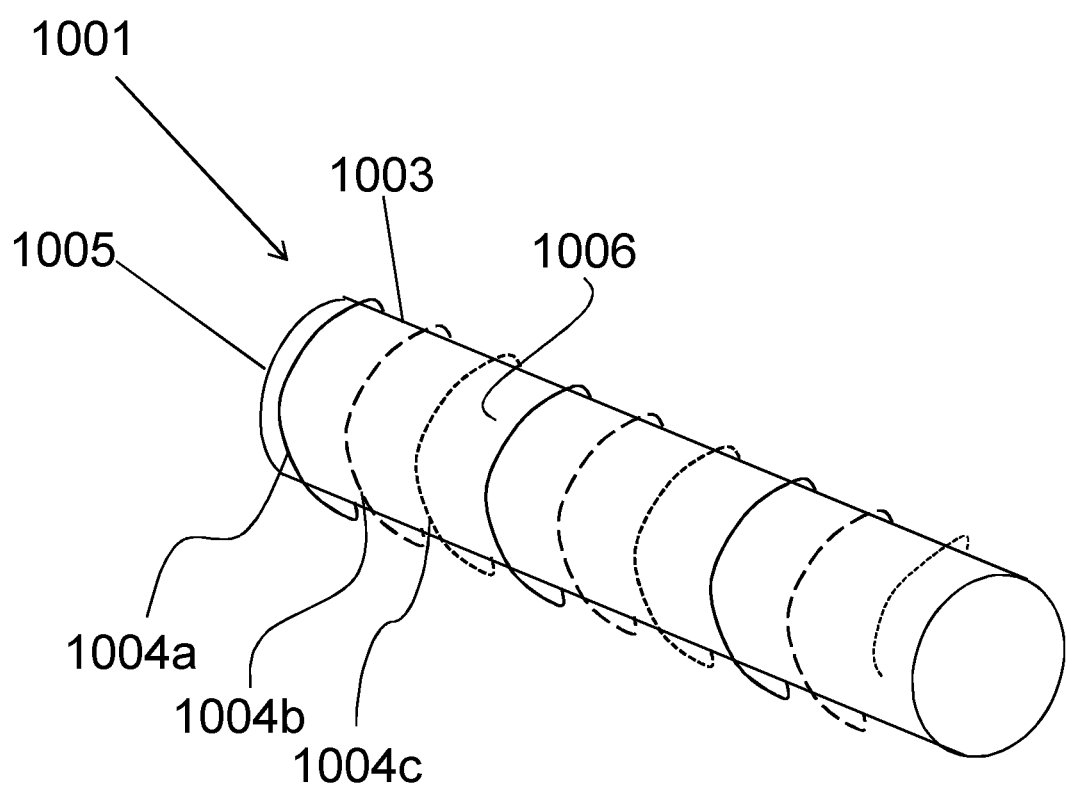
FIG. 11 is a schematic perspective view of an implantable marker comprising a cylindrical diamagnetic core and a triple helix formed from ferromagnetic wires which extends around an outer surface of the diamagnetic core, according to a fourth embodiment of the present disclosure.

FIG. 11 is a schematic drawing of yet another implantable marker 1001 according to a fourth embodiment of the present disclosure. The marker 1001 has a substantially cylindrical diamagnetic core 905 of isostatically pressed graphite, which has a diameter of about 1.15 mm and a length of about 8 mm. The diamagnetic core 1005 has a susceptibility of about $-1.2\times10^{-4}$. The diamagnetic core 1005 has a cylindrical outer surface 1006 which supports three ferromagnetic elements 1004a, 1004b, 1004c. Each ferromagnetic element 1004a, 1004b, 1004c comprises a coil of wire of a ferromagnetic iron-cobalt-based material, the wire having a diameter of about 15 µm. As shown in FIG. 11, the coils are arranged to form a triple helix 1003 with the respective wires 1004a, 1004b, 1004c not contacting one another. Suitably, the wires may be bonded or otherwise retained in position on the outer surface 1005. Each coil of the triple helix has a pitch of about 1.80 mm. Each coil in the triple helix 1003 comprises about 4.4 turns of wire, such that the total number of turns in the triple helix 1003 is about 14.2. The total length of ferromagnetic wire used in the triple helix is about 52 mm.

Figure 12:
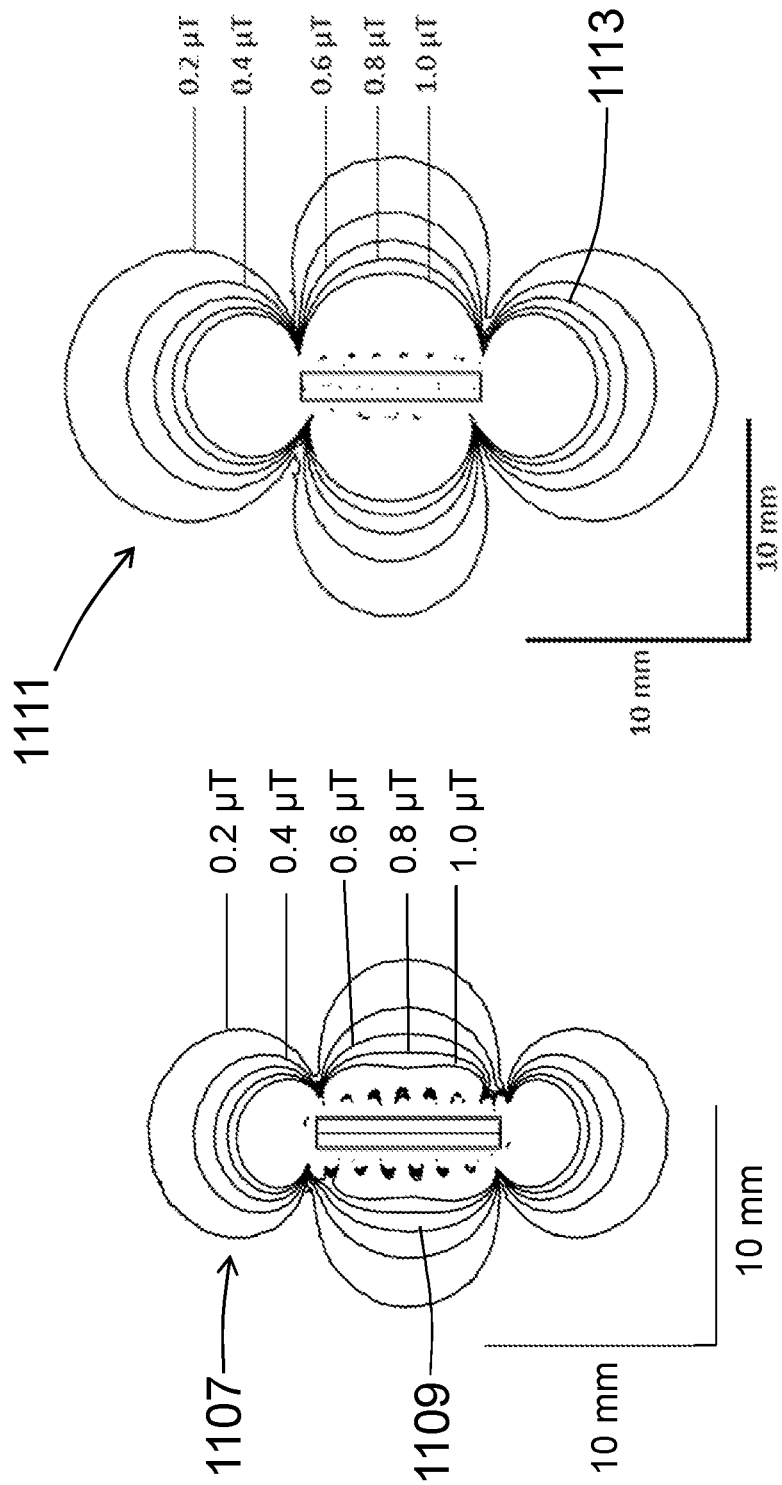
FIG. 12(a) is a contour map of magnetic flux density B in an x-z plane of an MRI scanner of the kind illustrated in FIG. 1(a) and/or FIG. 1(b), which shows how B deviates from an MRI field $B_0$ as a result of the presence in the field of the implantable marker of FIG. 10 in the field.
FIG. 12(b) is a comparative contour map of magnetic flux density B in an x-z plane of the MRI scanner, which shows how B deviates from an MRI field $B_0$ as a result of the presence in the field of the same configuration of ferromagnetic wires as shown in FIG. 10, but in the absence of the diamagnetic core.

In an MRI field of about 1.5 T, the total magnetic moment of the three ferromagnetic wires 1004a, 1004b, 1004c is calculated to be about $2.1\times10^{-6}$ A·m². Meanwhile, the magnetic moment of the diamagnetic core 1005 is about $-1.2\times10^{-6}$ A·m². The net magnetic moment of the marker 1001 of the present embodiment in the 1.5 T MRI field is therefore about $8.7\times10^{-7}$ A·m². FIG. 12(*a*) is a contour map 1107 showing the deviation $|B-B_0|_y$ in magnetic flux density $B_y$ from an MRI field $B_0$ of 3 T across an x-z plane of an MRI scanner, which results from the presence of the marker 1001 of FIG. 11 in the MRI field. The contour lines represent lines of constant flux deviation in the vicinity of the marker 1001. As discussed above, $B_{crit}$ is the magnitude of $|B-B_0|_y$ above which a voxel is mapped to an incorrect slice of an MRI image. A contour line at $B_{crit}$ thus represents an outline of an artefact which may be generated in the x-z plane for the marker 1001 of FIG. 11 in the MRI field, wherein the axial length of the marker 1001 is oriented along the y-axis. It has been found that a value of $B_{crit}$ of 0.6 µT, indicated by contour line 1109, gives reasonably good agreement between theoretical predictions and experimental data, but those skilled in the art will appreciate that $B_{crit}$ will depend on the configuration of a particular MRI machine (e.g. slice thickness). FIG. 12(*a*) therefore shows other contours at different values of $|B-B_0|_y$ to show how the artefact size varies for different values of $B_{crit}$.

For comparison, FIG. 12(*b*) is a contour map 1111 showing the deviation $|B-B_0|_y$ in magnetic flux density $B_y$ which would be generated in the same MRI field $B_0$ for the same configuration of ferromagnetic wires 1004a, 1004b, 1004c in the absence of the diamagnetic core 1005. Contour line 1113 represents $B_{crit}=0.6$ µT. The effect of the diamagnetic core on reducing the size of the artefact in the x-z plane in FIG. 12(*a*) is self-evident.

Using a triple helix 1003 may allow the same amount of wire to be used as a single helix within a given axial length, but with a longer pitch to increase the axial sensitivity of the marker, as the coils of the helix have a larger component of their direction along the axial length of the marker. A pitch of about 1.80 mm has been found to provide sufficient transverse sense performance whilst having a good axial sense performance resulting from the longer pitch. In this embodiment, the axial sense distance of the marker is about 34 mm, and the transverse sense distance is about 34 mm.

Figure 13:
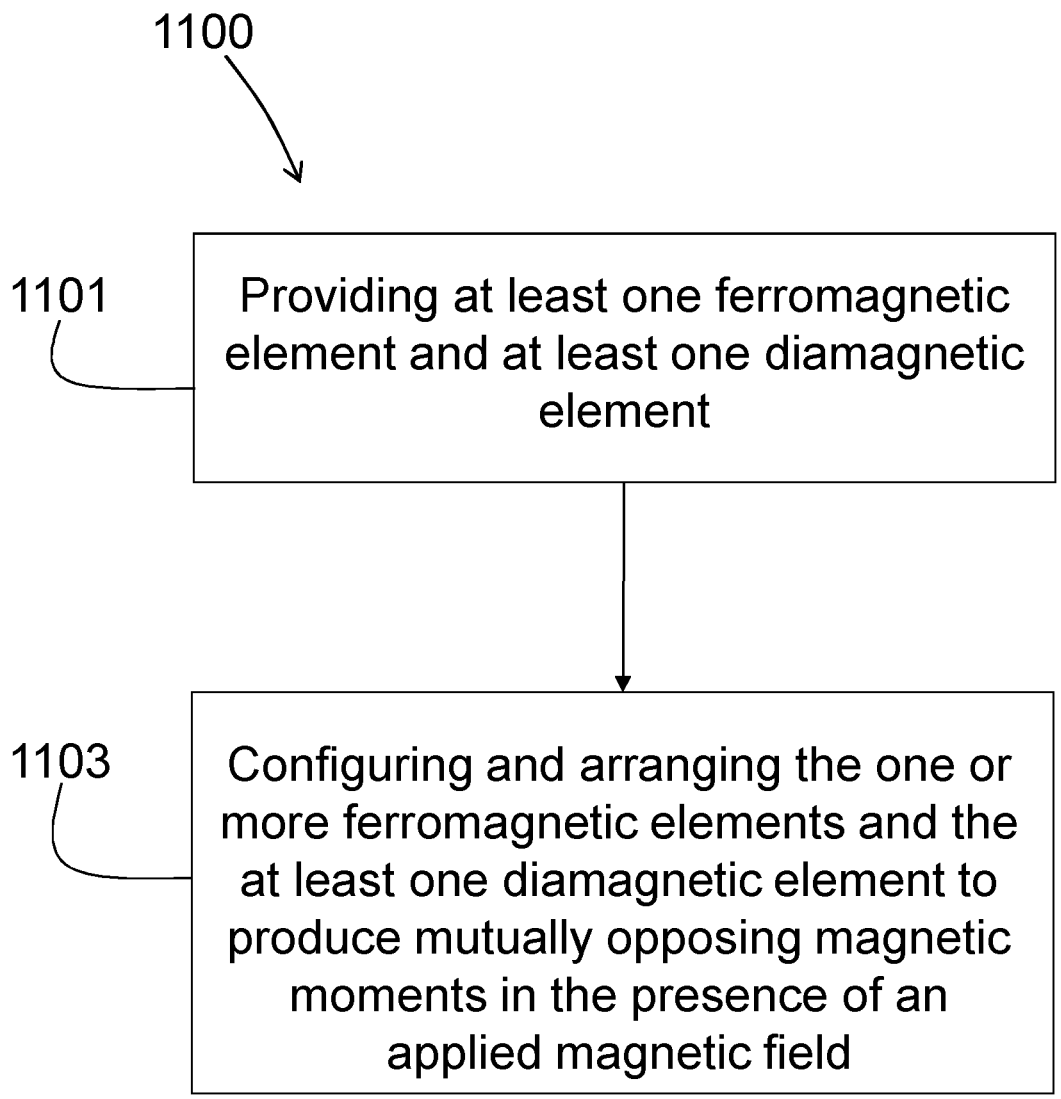
FIG. 13 is a flowchart showing a method of manufacturing an implantable marker, according to a fifth embodiment of the present disclosure.

FIG. 13 is a flowchart showing a method 1100 of manufacturing a marker, according to a fifth embodiment of the present disclosure. In a first step 1101, the method comprises providing at least one ferromagnetic element and at least one diamagnetic element. In a second step 1103, the method comprises configuring and arranging the one or more ferromagnetic elements and the at least one diamagnetic element juxtaposed one another such that they are co-located to produce mutually opposing magnetic moments in the presence of an applied magnetic field. The strength of the magnetic moment produced by the at least one diamagnetic element in relation to the strength of the magnetic moment produced by the at least one ferromagnetic element is relatively very low in a sensing field of less than about 0.5 mT, thereby to allow the magnetic moment produced by the at least one ferromagnetic element to be detected with a probe, and is relatively high in an MRI magnetic field of 1.5 T or more, thereby to minimise the size of an artefact produced by the marker on an MRI image by offsetting the magnetic moment of the at least one ferromagnetic element.

The ferromagnetic material configured into the required shape may then be encapsulated in a cylindrical housing. The cylindrical housing is preferably injectable in order to allow for placement of the marker. Suitably, therefore, the housing may have a maximum diameter such that it is deployable through a narrow gauge needle e.g. 18G to 12G, as disclosed above. The marker may be packaged within other materials, or a coating may be applied to the marker, to ensure that the marker is biocompatible and robust. The marker may be encased in a tube, for example made from Nitinol, titanium, stainless steel or other biocompatible alloys, the material preferably being non-magnetic and having a relatively low conductivity. A low conductivity may comprise a conductivity of below $10^6$ Siemens. Suitable coating materials include a polymer coating, such as Invar®, FEP, Parylene®, PTFE, ETFE, PE, PET, PVC or silicone or an epoxy based encapsulant.

It will be appreciated by those skilled in the art that features of the above-described embodiments may be combined in other embodiments that fall within the scope of the present disclosure.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. An implantable susceptometry marker for use in surgical guidance comprising one or more ferromagnetic elements and at least one diamagnetic element;
wherein the one or more ferromagnetic elements are formed of at least one ferromagnetic material having an initial relative permeability of at least 10,000 and a saturation induction $B_s$ of less than 1.5 T;
wherein the at least one diamagnetic element is formed of at least one diamagnetic material having a bulk susceptibility of less than $-0.16 \times 10^{-4}$, and
wherein a total volume of diamagnetic material in the marker is 100-10,000 times greater than a total volume of ferromagnetic material in the marker.

2. An implantable susceptometry marker as claimed in claim 1, wherein the at least one diamagnetic material has a bulk susceptibility in a range of $-0.16 \times 10^{-4}$ to about $-3 \times 10^{-4}$.

3. An implantable susceptometry marker as claimed in claim 1, wherein the total volume of the ferromagnetic material in the marker is between $1 \times 10^{-12}$ m$^3$ and $1 \times 10^{-10}$ m$^3$.

4. An implantable susceptometry marker as claimed in claim 1, wherein the total volume of the diamagnetic material in the marker is between $1 \times 10^{-9}$ m$^3$ and $1.5 \times 10^{-7}$ m$^3$.

5. An implantable susceptometry marker as claimed in claim 1, wherein the one or more ferromagnetic elements and the at least one diamagnetic element are co-located.

6. An implantable susceptometry marker as claimed in claim 1, wherein the one or more ferromagnetic elements comprise one or more wires or strips.

7. An implantable susceptometry marker as claimed in claim 6, wherein the one or more wires or strips have a total length to diameter, width, or square root of a cross-sectional area of the one or more wires or strips ratio of at least 50.

8. An implantable susceptometry marker as claimed in claim 1, wherein the at least one ferromagnetic material and the at least one diamagnetic material are present in respective volumes such that, in an MRI field, the one or more ferromagnetic elements and the at least one diamagnetic element generate opposing magnetic moments, an amplitude of a smaller one of the opposing magnetic moments is at least 25% of an amplitude of a stronger one of the opposing magnetic moments.

9. An implantable susceptometry marker as claimed in claim 1, wherein the at least one ferromagnetic material and the at least one diamagnetic material are present in respective volumes such that an amplitude of a magnetic moment generated by at least one of, the one or more ferromagnetic elements and, respectively, the at least one diamagnetic element is within 75% of an amplitude of a magnetic moment generated by the other of, the at least one diamagnetic element and, respectively, the one or more ferromagnetic elements under at least two different MRI fields.

10. An implantable susceptometry marker as claimed in claim 1, wherein the at least one ferromagnetic material is selected from cobalt-based amorphous metals, manganese-zinc ceramic ferrites, nickel-iron-based soft ferromagnetic alloys and nickel-zinc ceramic ferrites.

11. An implantable susceptometry marker as claimed in claim 1, wherein the at least one diamagnetic material of the at least one diamagnetic element is selected from pyrolytic graphite, graphite, graphite having a substantially isotropic grain structure, and bismuth.

12. An implantable susceptometry marker according to claim 1, wherein the one or more ferromagnetic elements extend individually, or collectively, along at least 80% of a length of the at least one diamagnetic element.

13. An implantable susceptometry marker according to claim 1, wherein a length of the at least one diamagnetic element is approximately the same as an overall length of the one or more ferromagnetic elements.

14. An implantable susceptometry marker according to claim 1, wherein a diameter of the at least one diamagnetic element is approximately the same as an overall diameter of the one or more ferromagnetic elements.

15. An implantable susceptometry marker according to claim 1, wherein at least one of the one or more ferromagnetic elements comprises a helical wire coil.

16. An implantable susceptometry marker according to claim 15, wherein the marker comprises a plurality of ferromagnetic elements which are configured as a multiple helix.

17. An implantable susceptometry marker as claimed in claim 1, wherein the at least one diamagnetic element has the form of a cylinder.

18. An implantable susceptometry marker as claimed in claim 17, wherein the one or more ferromagnetic elements comprise one or more wires or strips which are wrapped around an outer surface of the cylinder in the form of a helix or multiple helix.

19. A susceptometry detection system for locating an implantable marker, the system comprising:
- an implantable susceptometry marker as claimed in claim 1;
- at least one drive coil arranged to excite the implantable susceptometry marker with an alternating magnetic field and at least one sense coil arranged to detect a signal received from the excited implantable susceptometry marker;
- a magnetic field generator arranged to drive an alternating magnetic field through the at least one drive coil; and
- at least one detector arranged to receive a signal from the sense coil and detect one or more harmonics of a drive frequency in the received signal.

20. A method of manufacturing an implantable susceptometry magnetic marker for use in surgery, the method comprising:
- forming one or more ferromagnetic elements from at least one ferromagnetic material having an initial relative permeability of at least 10,000 and a saturation induction $B_s$ of less than 1.5 T,
- forming at least one diamagnetic element from at least one diamagnetic material, the at least one diamagnetic material having a bulk susceptibility less than $-0.16 \times 10^{-4}$, a total volume of diamagnetic material in the marker being 100-10,000 times greater than a total volume of ferromagnetic material in the marker, and thereafter
- assembling the one or more ferromagnetic elements and at least one diamagnetic element, such that the at least one diamagnetic element is colocated with the one or more ferromagnetic elements and is configured such that in an MRI field the at least one diamagnetic element produces an artefact having a size and shape that substantially matches an artefact size and shape of an artefact produced by the one or more ferromagnetic elements.

* * * * *